United States Patent
Chiappetta et al.

(10) Patent No.: US 7,024,278 B2
(45) Date of Patent: Apr. 4, 2006

(54) NAVIGATIONAL CONTROL SYSTEM FOR A ROBOTIC DEVICE

(75) Inventors: Mark J. Chiappetta, Chelmsford, MA (US); Joseph L. Jones, Acton, MA (US)

(73) Assignee: IRobot Corporation, Burlington, MA (US)

( * ) Notice: Subject to any disclaimer, the term of this patent is extended or adjusted under 35 U.S.C. 154(b) by 222 days.

(21) Appl. No.: 10/661,835

(22) Filed: Sep. 12, 2003

(65) Prior Publication Data

US 2004/0111184 A1 Jun. 10, 2004

Related U.S. Application Data

(60) Provisional application No. 60/410,480, filed on Sep. 13, 2002.

(51) Int. Cl.
*G06F 19/00* (2006.01)

(52) U.S. Cl. ............. 700/245; 318/568.12; 318/567; 701/23; 701/210; 901/1; 901/46; 901/47; 180/168; 180/169; 15/319

(58) Field of Classification Search ............ 700/245; 318/568.12, 567; 15/319; 701/23, 210; 180/168–169; 901/1, 46–47
See application file for complete search history.

(56) References Cited

U.S. PATENT DOCUMENTS

| | | | |
|---|---|---|---|
| 4,119,900 A | 10/1978 | Kreimintz | |
| 4,700,427 A | 10/1987 | Knepper | |
| 5,109,566 A | 5/1992 | Kobayashi et al. | |
| 5,353,224 A | 10/1994 | Lee et al. | |
| 5,363,305 A | 11/1994 | Cox et al. | |
| 5,537,017 A | 7/1996 | Feiten et al. | |
| 5,548,511 A | 8/1996 | Bancroft | |
| 5,650,702 A | 7/1997 | Azumi | |
| 6,255,793 B1 | 7/2001 | Peless et al. | |
| 6,282,526 B1 | 8/2001 | Ganesh | |
| 6,442,476 B1 | 8/2002 | Poropat | |
| 6,690,134 B1* | 2/2004 | Jones et al. ................. 318/567 |
| 6,781,338 B1* | 8/2004 | Jones et al. ................. 318/567 |
| 6,809,490 B1* | 10/2004 | Jones et al. ............ 318/568.12 |
| 6,883,201 B1* | 4/2005 | Jones et al. .................... 15/319 |
| 2002/0049530 A1 | 4/2002 | Poropat | |
| 2004/0020000 A1* | 2/2004 | Jones ........................... 15/319 |
| 2004/0049877 A1* | 3/2004 | Jones et al. .................... 15/319 |
| 2004/0187249 A1* | 9/2004 | Jones et al. .................... 15/319 |

\* cited by examiner

*Primary Examiner*—Thomas G. Black
*Assistant Examiner*—McDieunel Marc
(74) *Attorney, Agent, or Firm*—Gesmer Updegrove LLP; David A. Jacobs

(57) ABSTRACT

A navigational control system for altering movement activity of a robotic device operating in a defined working area, comprising a transmitting subsystem integrated in combination with the robotic device, for emitting a number of directed beams, each directed beam having a predetermined emission pattern, and a receiving subsystem functioning as a base station that includes a navigation control algorithm that defines a predetermined triggering event for the navigational control system and a set of detection units positioned within the defined working area in a known spaced-apart relationship, the set of detection units being configured and operative to detect one or more of the directed beams emitted by the transmitting system; and wherein the receiving subsystem is configured and operative to process the one or more detected directed beams under the control of the navigational control algorithm to determine whether the predetermined triggering event has occurred, and, if the predetermined triggering event has occurred transmit a control signal to the robotic device, wherein reception of the control signal by the robotic device causes the robotic device to implement a prescribed conduct that alters the movement activity of the robotic device.

5 Claims, 10 Drawing Sheets

NAVIGATIONAL CONTROL SYSTEM FOR A ROBOTIC DEVICE

CROSS-REFERENCE TO RELATED APPLICATION

This nonprovisional patent application is based upon and claims priority from U.S. provisional patent application Ser. No. 60/410,480, filed 13 Sep. 2002, entitled BEACON-BASED NAVIGATIONAL SYSTEM.

This nonprovisional patent application is related to commonly-owned, co-pending U.S. nonprovisional patent application Ser. No. 10/056,804, filed 24 Jan. 2002, entitled METHOD AND SYSTEM FOR ROBOT LOCALIZATION AND CONFINEMENT, U.S. nonprovisional patent application Ser. No. 10/320,729, filed 16 Dec. 2002, entitled AUTONOMOUS FLOOR-CLEANING DEVICE, U.S. nonprovisional patent application Ser. No. 10/167,851, filed 12 Jun. 2002, entitled METHOD AND SYSTEM FOR MULTI-MODE COVERAGE FOR AN AUTONOMOUS ROBOT, and U.S. nonprovisional continuation-in-part patent application Ser. No. 10/453,202, filed 03 Jun. 2003, entitled ROBOT OBSTACLE DETECTION SYSTEM, each of which is hereby incorporated by reference.

BACKGROUND OF THE INVENTION (1) Field of the Invention

The present invention relates generally to mobile robotic devices, and more particularly, to a navigational control system for a robotic device operating under the direction of a navigation control algorithm that tracks the movement activity of the robotic device and utilizes movement activity to provide one or more control instructions to the robotic device, which in response thereto, implements a prescribed conduct, e.g., one or more basic maneuvers and/or behavioral patterns to increase the coverage efficiency of such robotic devices for covering a defined working area, e.g., sweeping, vacuuming a room, and/or performing residential yard maintenance.

(2) Description of Related Prior Art

Robotic engineers have long worked on developing an effective method of autonomous cleaning. This has led to the development of two separate and distinct schemes for autonomous robotic devices: (1) deterministic cleaning; and (2) random cleaning.

In deterministic cleaning, where the cleaning rate equals the coverage rate and is, therefore, a more efficient cleaning method than random-motion cleaning, the autonomous robotic device follows a defined path, e.g., a boustrophedon path that is calculated to facilitate complete cleaning coverage of a given area while eliminating redundant cleaning. Deterministic cleaning requires that the robotic device maintain precise position knowledge at all times, as well as its position history (where it has been), which, in turn, requires a sophisticated positioning system. A suitable positioning system—a positioning system suitably accurate for deterministic cleaning might rely on scanning laser ranging systems, ultrasonic transducers, a carrier phase differential GPS, or other sophisticated methods—is typically prohibitively expensive and labor intensive, requiring an involved pre-setup to accommodate the unique conditions of each area to be cleaned, e.g., room geometry, furniture locations. In addition, methods that rely on global positioning are typically incapacitated by failure of any part of the positioning system.

One illustrative example of a highly sophisticated (and relatively expensive) robotic device for deterministic cleaning is the RoboScrub device built by Denning Mobile Robotics and Windsor Industries. The RoboScrub device employs sonar and infrared detectors, bump sensors, and a high-precision laser navigation system to define the deterministic cleaning path. The navigation system employed with the RoboScrub device requires numerous large bar code targets to be set up in various strategic positions within the area to be cleaned, and effective operation of the navigation system requires that at least four of such targets be visible simultaneously. This target accessibility requirement effectively limits the use of the RoboScrub device to large uncluttered open areas.

Other representative deterministic robotic devices are described in U.S. Pat. No. 5,650,702 (Azumi), U.S. Pat. No. 5,548,511 (Bancroft), U.S. Pat. No. 5,537,017 (Feiten et al.), U.S. Pat. No. 5,353,224 (Lee et al.), U.S. Pat. No. 4,700,427 (Knepper), and U.S. Pat. No. 4,119,900 (Kreimnitz). These representative deterministic robotic devices are likewise relatively expensive, require labor intensive pre-setup, and/or are effectively limited to large, uncluttered areas of simple geometric configuration (square, rectangular rooms with minimal (or no) furniture).

Due to the limitations and difficulties inherent in purely deterministic cleaning systems, some robotic devices rely on pseudo-deterministic cleaning schemes such as dead reckoning. Dead reckoning consists of continually measuring the precise rotation of each drive wheel (e.g., using optical shaft encoders) to continually calculate the current position of the robotic device, based upon a known starting point and orientation. In addition to the disadvantages of having to start cleaning operations from a fixed position with the robotic device in a specified orientation, the drive wheels of dead reckoning robotic devices are almost always subject to some degree of slippage, which leads to errors in the calculation of current position. Accordingly, dead reckoning robotic devices are generally considered unreliable for cleaning operations of any great duration—resulting in intractable system neglect, i.e., areas of the surface to be cleaned are not cleaned. Other representative examples of pseudo-deterministic robotic devices are described in U.S. Pat. No. 6,255,793 (Peless et al.) and U.S. Pat. No. 5,109,566 (Kobayashi et al.).

A robotic device operating in random motion, under the control of one or more random-motion algorithms stored in the robotic device, represents the other basic approach to cleaning operations using autonomous robotic devices. The robotic device autonomously implement such random-motion algorithm(s) in response to internal events, e.g., signals generated by a sensor system, elapse of a time period (random or predetermined). In a typical room without obstacles, a robotic device operating under the control of a random-motion algorithm will provide acceptable cleaning coverage given enough cleaning time. Compared to a robotic device operating in a deterministic cleaning mode, a robotic device utilizing a random-motion algorithm must operate for a longer period of time to achieve acceptable cleaning coverage. To have a high confidence that a random-motion robotic device has cleaned 98% of an obstacle-free room, the random-motion robotic device must run approximately five times longer than a deterministic robotic device having similarly sized cleaning mechanisms and moving at approximately the same speed.

However, an area to be cleaned that includes one or more randomly-situated obstacles causes a marked increase in the running time for a random-motion robotic device to effect 98% cleaning coverage. Therefore, while a random motion robotic device is a relatively inexpensive means of cleaning a defined working area as contrasted to a deterministic robotic device, the random-motion robotic device requires a significantly higher cleaning time.

A need exists to provide a deterministic component to a random-motion robotic device to enhance the cleaning efficiency thereof to reduce the running time for the random-motion robotic cleaning to achieve a 98% cleaning coverage.

BRIEF SUMMARY OF THE INVENTION

One object of the present invention is to provide a navigational control system that enhances the cleaning efficiency of a robotic device by adding a deterministic component (in the form of a conduct prescribed by a navigation control algorithm) to the random motion of the robotic device generated by predetermined behavioral modes stored in the robotic device.

Another object of the present invention is to provide a navigational control unit operating under a navigation control algorithm that includes a predetermined triggering event that defines when the prescribed conduct will be implemented by the robotic device.

These and other objects of the present invention are achieved by means of a navigational control system for deterministically altering movement activity of a robotic device operating in a defined working area, comprising a transmitting subsystem integrated in combination with the robotic device, the transmitting subsystem comprising means for emitting a number of directed beams, each directed beam having a predetermined emission pattern, and a receiving subsystem functioning as a base station that includes a navigation control algorithm that defines a predetermined triggering event for the navigational control system and a set of detection units positioned within the defined working area, the detection units being positioned in a known aspectual relationship with respect to one another, the set of detection units being configured and operative to detect one or more of the directed beams emitted by the transmitting system; and wherein the receiving subsystem is configured and operative to process the one or more detected directed beams under the control of the navigational control algorithm to determine whether the predetermined triggering event has occurred, and, if the predetermined triggering event has occurred transmit a control signal to the robotic device, wherein reception of the control signal by the robotic device causes the robotic device to implement a prescribed conduct that deterministically alters the movement activity of the robotic device.

BRIEF DESCRIPTION OF THE DRAWINGS

A more complete understanding of the present invention and the attendant features and advantages thereof can be had by reference to the following detailed description of the invention when considered in conjunction with the accompanying drawings wherein.

DETAILED DESCRIPTION OF THE INVENTION

Figure 1:
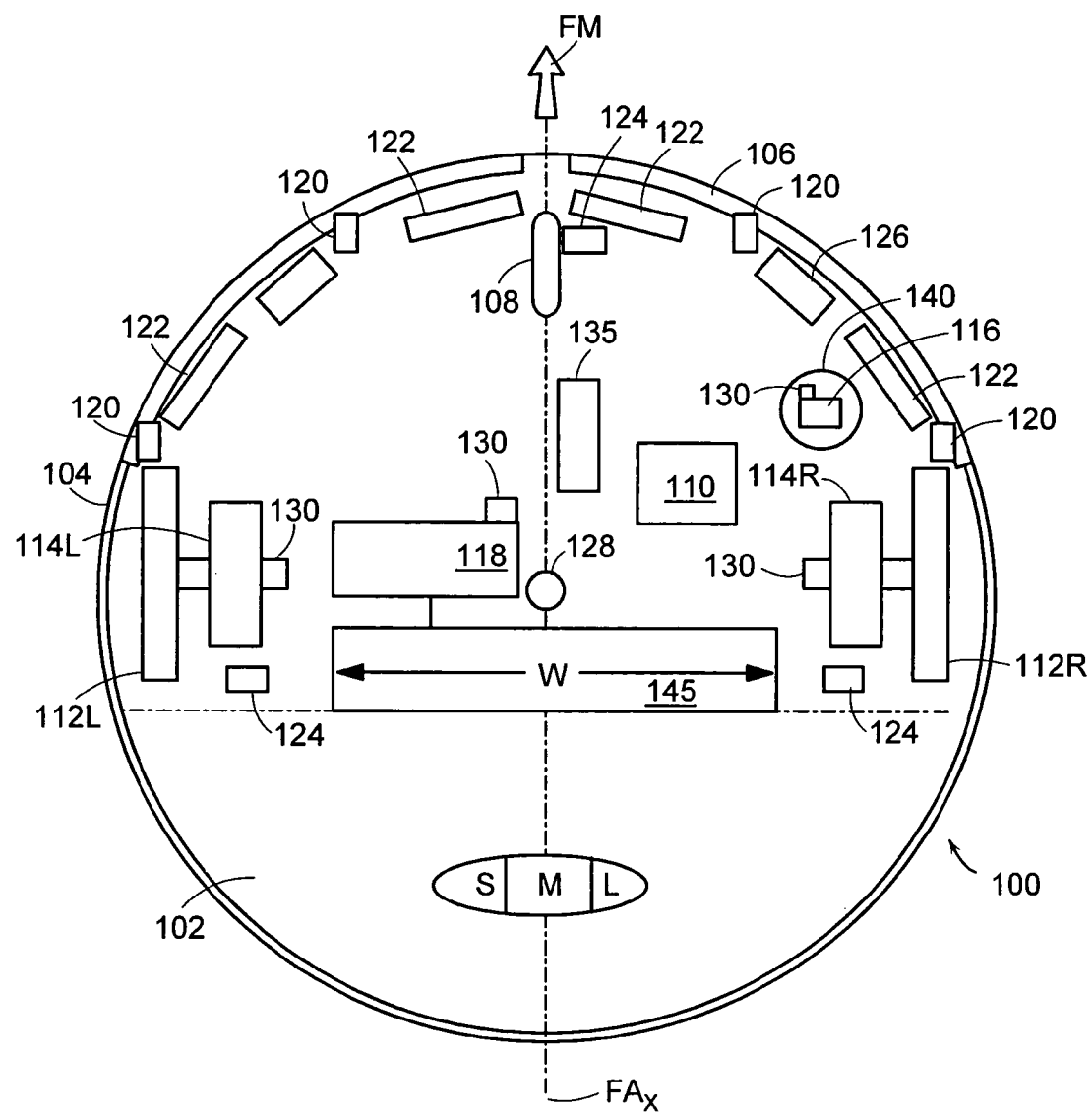
FIG. 1 is a top-view schematic of an exemplary robotic device having particular utility for use in the navigational control system according to the present invention.
Figure 2:
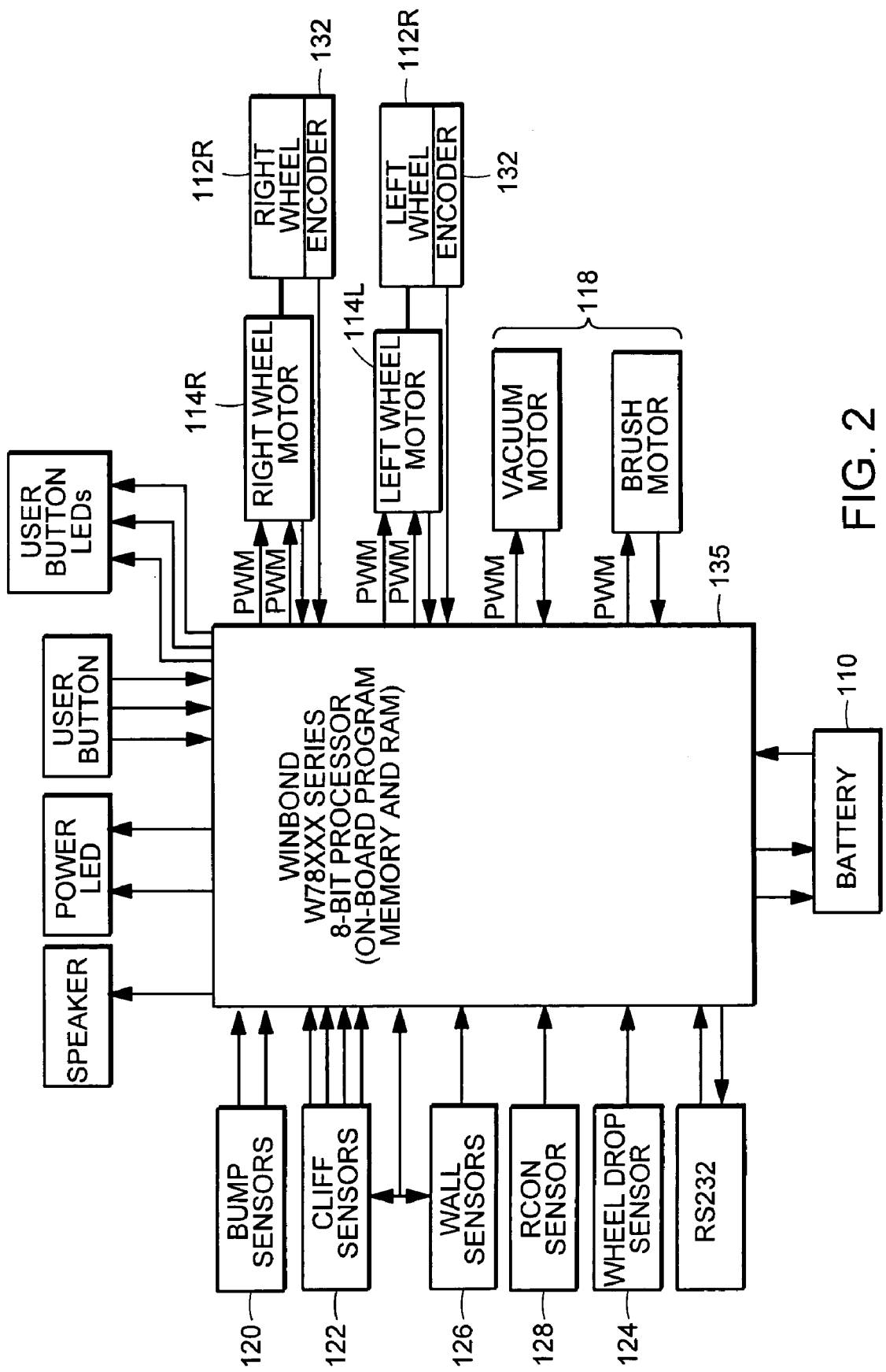
FIG. 2 is an exemplary hardware block diagram for the robotic device of FIG. 1.

Referring now to the drawings wherein like reference numerals identify corresponding or similar elements throughout the several views, FIG. 1 is a top-view schematic of an exemplary preferred embodiment of a robotic device 100 having particular utility in combination with a navigational control system 10 according to the present invention. FIG. 2 is a block diagram of the hardware of the robot device 100 of FIG. 1.

The hardware and behavioral modes (coverage behaviors for cleaning operations; escape behaviors for transitory movement patterns; and safety behaviors for emergency conditions) of the robotic device 100, which is manufactured, distributed, and/or marketed by the iRobot Corporation of Burlington, Mass. under the ROOMBA trademark, are briefly described in the following paragraphs to facilitate a more complete understanding of the navigational control system 10 of the present invention. Further details regarding the hardware and behavioral modes of the robotic device 100 can be found in commonly-owned, co-pending U.S. nonprovisional patent application Ser. No. 10/167,851, filed 12 Jun. 2002, entitled METHOD AND SYSTEM FOR MULTI-MODE COVERAGE FOR AN AUTONOMOUS ROBOT, and U.S. nonprovisional patent application Ser. No. 10/320,729, filed 16 Dec. 2002, entitled AUTONOMOUS FLOOR-CLEANING DEVICE.

In the following description of the robotic device 100, use of the terminology "forward"/"fore" refers to the primary direction of motion (forward) of the robotic device (see arrow identified by reference character "FM" in FIG. 1). The fore/aft axis $FA_X$ of the robotic device 100 coincides with the medial diameter of the robotic device 100 that divides the robotic device 100 into generally symmetrical right and left halves, which are defined as the dominant and non-dominant sides, respectively.

Robotic Device

The robotic device 100 has a generally cylindrical housing infrastructure that includes a chassis 102 and an outer shell 104 secured to the chassis 102 that define a structural envelope of minimal height (to facilitate movement under furniture). The hardware comprising the robotic device 100 can be generally categorized as the functional elements of a power system, a motive power system, a sensor system, a control module, a side brush assembly, or a self-adjusting cleaning head system, respectively, all of which are integrated in combination with the housing infrastructure. In addition to such categorized hardware, the robotic device 100 further includes a forward bumper 106 having a generally arcuate configuration and a nose-wheel assembly 108.

The forward bumper 106 (illustrated as a single component; alternatively, a two-segment component) is integrated in movable combination with the chassis 102 (by means of displaceable support members pairs) to extend outwardly therefrom. Whenever the robotic device 100 impacts an obstacle (e.g., wall, furniture) during movement thereof, the bumper 106 is displaced (compressed) towards the chassis 102 and returns to its extended (operating) position when contact with the obstacle is terminated.

The nose-wheel assembly 108 is mounted in biased combination with the chassis 102 so that the nose-wheel subassembly 108 is in a retracted position (due to the weight of the robotic device 100) during cleaning operations wherein it rotates freely over the surface being cleaned. When the nose-wheel subassembly 108 encounters a drop-off during operation (e.g., descending stairs, split-level floors), the nose-wheel assembly 108 is biased to an extended position.

The hardware of the power system, which provides the energy to power the electrically-operated hardware of the robotic device 100, comprises a rechargeable battery pack 110 (and associated conduction lines, not shown) that is integrated in combination with the chassis 102.

The motive power system provides the means that propels the robotic device 100 and operates the cleaning mechanisms, e.g., side brush assembly and the self-adjusting cleaning head system, during movement of the robotic device 100. The motive power system comprises left and right main drive wheel assemblies 112L, 112R, their associated independent electric motors 114L, 114R, and electric motors 116, 118 for operation of the side brush assembly and the self-adjusting cleaning head subsystem, respectively.

The main drive wheel assemblies 112L, 112R are independently mounted in biased combination with the chassis 102 (for pivotal motion with respect thereto) at opposed ends of the transverse diameter (with respect to the fore-aft axis $FA_X$) of the robotic device 100 and are in a retracted position (due to the weight of the robotic device 100) during operation thereof wherein the axes of rotation are approximately coplanar with the bottom of the chassis 102. If the robotic device 100 is removed from the surface being cleaned, the main wheel assemblies 112L, 112R are pivotally-biased to an extended position wherein their axes of rotation are below the bottom plane of the chassis 102 (in this extended position the rechargeable battery pack 110 is automatically turned off by the control module executing one of the safety behavioral modes).

The electric motors 114L, 114R are mechanically coupled to the main drive wheel assemblies 112L, 112R, respectively, and independently operated by control signals generated by the control module as a response to the implementation of a behavioral mode. Independent operation of the electric motors 114L, 114R allows the main wheel assemblies 112L, 112R to be: (1) rotated at the same speed in the same direction to propel the robotic device 100 in a straight line, forward or aft; (2) differentially rotated (including the condition wherein one wheel assembly is not rotated) to effect a variety of right and/or left turning patterns (over a spectrum of sharp to shallow turns) for the robotic device 100; and (3) rotated at the same speed in opposite directions to cause the robotic device 100 to turn in place, i.e., "spin on a dime", to provide an extensive repertoire of movement capability for the robotic device 100.

The sensor system comprises a variety of different sensor units that are operative to generate signals that control the behavioral mode operations of the robotic device 100. The described robotic device 100 includes obstacle detection units 120, cliff detection units 122, wheel drop sensors 124, an obstacle-following unit 126, a virtual wall omnidirectional detector 128, stall-sensor units 130, and main wheel encoder units 132.

For the described embodiment, the obstacle ("bump") detection units 120 are IR break beam sensors mounted in combination with the displaceable support member pairs of the forward bumper 106. These detection units 120 are operative to generate one or more signals indicating relative displacement between one or more support member pairs whenever the robotic device 100 impacts an obstacle such that the forward bumper 106 is compressed. These signals are processed by the control module to determine an approximate point of contact with the obstacle relative to the fore-aft axis $FA_X$ of the robotic device 100 (and the behavioral mode(s) to be implemented).

The cliff detection units 122 are mounted in combination with the forward bumper 106. Each cliff detection unit 122 comprises an IR emitter-detector pair configured and operative to establish a focal point such that radiation emitted downwardly by the emitter is reflected from the surface being traversed and detected by the detector. If reflected radiation is not detected by the detector, i.e., a drop-off is encountered, the cliff detection unit 122 transmits a signal to the control module (which causes one or more behavioral modes to be implemented).

A wheel drop sensor 124 such as a contact switch is integrated in combination with each of the main drive wheel assemblies 112L, 112R and the nose wheel assembly 108 and is operative to generate a signal whenever any of the wheel assemblies is in an extended position, i.e., not in contact with the surface being traversed, (which causes the control module to implement one ore more behavioral modes).

The obstacle-following unit 126 for the described embodiment is an IR emitter-detector pair mounted on the 'dominant' side (right hand side of FIG. 1) of the robotic device 100. The emitter-detector pair is similar in configuration to the cliff detection units 112, but is positioned so that the emitter emits radiation laterally from the dominant side of the robotic device 100. The unit 126 is operative to transmit a signal to the control module whenever an obstacle is detected as a result of radiation reflected from the obstacle and detected by the detector. The control module, in response to this signal, causes one or more behavioral modes to be implemented.

A virtual wall detection system for use in conjunction with the described embodiment of the robotic device 100 comprises an omnidirectional detector 128 mounted atop the outer shell 104 and a stand-alone transmitting unit (not shown) that transmits an axially-directed confinement beam. The stand-alone transmitting unit is positioned so that the emitted confinement beam blocks an accessway to a defined working area, thereby restricting the robotic device 100 to operations within the defined working area (e.g., in a doorway to confine the robotic device 100 within a specific room to be cleaned). Upon detection of the confinement beam, the omnidirectional detector 128 transmits a signal to the control module (which causes one or more behavioral modes to be implemented to move the robotic device 100 away from the confinement beam generated by the stand-alone transmitting unit).

A stall sensor unit 130 is integrated in combination with each electric motor 114L, 114R, 116, 118 and operative to transmit a signal to the control module when a change in current is detected in the associated electric motor (which is indicative of a dysfunctional condition in the corresponding driven hardware). The control module is operative in response to such a signal to implement one or more behavioral modes.

An IR encoder unit 132 (see FIG. 2) is integrated in combination with each main wheel assembly 112L, 112R and operative to detect the rotation of the corresponding wheel and transmit signals corresponding thereto the control module (wheel rotation can be used to provide an estimate of distance traveled for the robotic device 100).

The control module comprises the microprocessing unit 135 illustrated in FIG. 2 that includes I/O ports connected to the sensors and controllable hardware of the robotic device 100, a microcontroller, and ROM and RAM memory. The I/O ports function as the interface between the microcontroller and the sensor units and controllable hardware, transferring signals generated by the sensor units to the microcontroller and transferring control (instruction) signals generated by the microcontroller to the controllable hardware to implement a specific behavioral mode.

The microcontroller is operative to execute instruction sets for processing sensor signals, implementing specific behavioral modes based upon such processed signals, and generating control (instruction) signals for the controllable hardware based upon implemented behavioral modes for the robotic device 100. The cleaning coverage and control programs for the robotic device 100 are stored in the ROM of the microprocessing unit 135, which includes the behavioral modes, sensor processing algorithms, control signal generation algorithms and a prioritization algorithm for determining which behavioral mode or modes are to be given control of the robotic device 100. The RAM of the microprocessing unit 135 is used to store the active state of the robotic device 100, including the ID of the behavioral mode(s) under which the robotic device 100 is currently being operated and the hardware commands associated therewith.

The side brush assembly 140 is configured and operative to entrain particulates outside the periphery of the housing infrastructure and to direct such particulates towards the self-adjusting cleaning head system. The side brush assembly 140 provides the robotic device 100 with the capability of cleaning surfaces adjacent to base-boards when the robotic device is operated in an Obstacle-Following behavioral mode. As shown in FIG. 1, the side brush assembly 140 is preferably mounted in combination with the chassis 102 in the forward quadrant on the dominant side of the robotic device 100.

The self-adjusting cleaning head system 145 for the described robotic device 100 comprises a dual-stage brush assembly and a vacuum assembly, each of which is independently powered by an electric motor (reference numeral 118 in FIG. 1 actually identifies two independent electric motors—one for the brush assembly and one for the vacuum assembly). The cleaning capability of the robotic device 100 is commonly characterized in terms of the width of the cleaning head system 145 (see reference character W in FIG. 1).

The dual-stage brush assembly and the inlet of the vacuum assembly are integrated in combination with a deck structure, which is pivotally mounted in combination with the chassis 102 and operatively integrated with the motor of the dual-stage brush assembly. In response to a predetermined reduction in rotational speed of the brush assembly motor, the brush assembly motor provides the motive force to pivot the deck structure with respect to the chassis 102. The pivoting deck structure provides the self adjusting capability for the cleaning head assembly 145, which allows the robotic device 100 to readily transition between disparate surfaces during cleaning operations, e.g., carpeted surface to bare surface or vice versa, without hanging up.

The dual-stage brush assembly comprises asymmetric, counter-rotating brushes that are positioned (forward of the inlet of the vacuum assembly), configured and operative to direct particulate debris into a removable dust cartridge (not shown). The positioning, configuration, and operation of the brush assembly concomitantly directs particulate debris towards the inlet of the vacuum assembly such that particulates that are not swept up by the dual-stage brush assembly can be subsequently ingested by the vacuum assembly as a result of movement of the robotic device 100.

Operation of the vacuum assembly independently of the self-adjustable brush assembly allows the vacuum assembly to generate and maintain a higher vacuum force using a battery-power source than would be possible if the vacuum assembly were operated in dependence with the brush assembly.

Behavioral Modes for Robotic Device

The robotic device 100 uses a variety of behavioral modes to effectively clean a defined working area where behavioral modes are layers of control systems that can be operated in parallel. The microprocessor unit 135 is operative to execute a prioritized arbitration scheme to identify and implement one or more dominant behavioral modes for any given scenario based upon inputs from the sensor system.

The behavioral modes for the described robotic device 100 can be characterized as: (1) coverage behavioral modes; (2) escape behavioral modes; and (3) safety behavioral modes. Coverage behavioral modes are primarily designed to allow the robotic device 100 to perform its cleaning operations in an efficient and effective manner and the escape and safety behavioral modes are priority behavioral modes implemented when a signal from the sensor system indicates that normal operation of the robotic device 100 is impaired, e.g., obstacle encountered, or is likely to be impaired, e.g., drop-off detected.

Representative and illustrative coverage behavioral (cleaning) modes for the robotic device 100 include: (1) a Spot Coverage pattern; (2) an Obstacle-Following (or Edge-Cleaning) Coverage pattern, and (3) a Room Coverage pattern. The Spot Coverage pattern causes the robotic device 100 to clean a limited area within the defined working area, e.g., a high-traffic area. In a preferred embodiment the Spot Coverage pattern is implemented by means of a spiral algorithm (but other types of self-bounded area algorithms, e.g., polygonal, can be used). The spiral algorithm, which causes outward spiraling (preferred) or inward spiraling movement of the robotic device 100, is implemented by control signals from the microprocessing unit 135 to the main wheel assemblies 112L, 112R to change the turn radius/radii thereof as a function of time (thereby increasing/decreasing the spiral movement pattern of the robotic device 100).

The robotic device 100 is operated in the Spot Coverage pattern for a predetermined or random period of time, for a predetermined or random distance (e.g., a maximum spiral distance) and/or until the occurrence of a specified event, e.g., activation of one or more of the obstacle detection units 120 (collectively a transition condition). Once a transition condition occurs, the robotic device 100 can implement or transition to a different behavioral mode, e.g., a Straight Line behavioral mode (in a preferred embodiment of the robotic device 100, the Straight Line behavioral mode is a low priority, default behavior that propels the robot in an approximately straight line at a preset velocity of approximately 0.306 m/s) or a Bounce behavioral mode in combination with a Straight Line behavioral mode.

If the transition condition is the result of the robotic device 100 encountering an obstacle, the robotic device 100 can take other actions in lieu of transitioning to a different behavioral mode. The robotic device 100 can momentarily implement a behavioral mode to avoid or escape the obstacle and resume operation under control of the spiral algorithm (i.e., continue spiraling in the same direction). Alternatively, the robotic device 100 can momentarily implement a behavioral mode to avoid or escape the obstacle and resume operation under control of the spiral algorithm (but in the opposite direction-reflective spiraling).

The Obstacle-Following Coverage pattern causes the robotic device 100 to clean the perimeter of the defined working area, e.g., a room bounded by walls, and/or the perimeter of an obstacle (e.g., furniture) within the defined working area. Preferably the robotic device 100 utilizes obstacle-following unit 126 to continuously maintain its position with respect to an obstacle, e.g., wall, furniture, so that the motion of the robotic device 100 causes it to travel adjacent to and concomitantly clean along the perimeter of the obstacle. Different embodiments of the obstacle-following unit 126 can be used to implement the Obstacle-Following behavioral pattern.

In a first embodiment, the obstacle-following unit 126 is operated to detect the presence or absence of the obstacle. In an alternative embodiment, the obstacle-following unit 126 is operated to detect an obstacle and then maintain a predetermined distance between the obstacle and the robotic device 100. In the first embodiment, the microprocessing unit 135 is operative, in response to signals from the obstacle-following unit, to implement small CW or CCW turns to maintain its position with respect to the obstacle. The robotic device 100 implements a small CW when the robotic device 100 transitions from obstacle detection to non-detection (reflection to non-reflection) or to implement a small CCW turn when the robotic device 100 transitions from non-detection to detection (non-reflection to reflection). Similar turning behaviors are implemented by the robotic device 100 to maintain the predetermined distance from the obstacle.

The robotic device 100 is operated in the Obstacle-Following behavioral mode for a predetermined or random period of time, for a predetermined or random distance (e.g., a maximum or minimum distance) and/or until the occurrence of a specified event, e.g., activation of one or more of the obstacle detection units 120 a predetermined number of times (collectively a transition condition). In certain embodiments, the microprocessor 135 will cause the robotic device to implement an Align behavioral mode upon activation of the obstacle-detection units 120 in the Obstacle-Following behavioral mode wherein the implements a minimum angle CCW turn to align the robotic device 100 with the obstacle.

The Room Coverage pattern can be used by the robotic device 100 to clean any defined working area that is bounded by walls, stairs, obstacles or other barriers (e.g., a virtual wall unit). A preferred embodiment for the Room Coverage pattern comprises the Random-Bounce behavioral mode in combination with the Straight Line behavioral mode. Initially, the robotic device 100 travels under control of the Straight-Line behavioral mode, i.e., straight-line algorithm (main drive wheel assemblies 112L, 112R operating at the same rotational speed in the same direction) until an obstacle is encountered. Upon activation of one or more of the obstacle detection units 120, the microprocessing unit 135 is operative to compute an acceptable range of new directions based upon the obstacle detection unit(s) 126 activated. The microprocessing unit 135 selects a new heading from within the acceptable range and implements a CW or CCW turn to achieve the new heading with minimal movement. In some embodiments, the new turn heading may be followed by forward movement to increase the cleaning efficiency of the robotic device 100. The new heading may be randomly selected across the acceptable range of headings, or based upon some statistical selection scheme, e.g., Gaussian distribution. In other embodiments of the Room Coverage behavioral mode, the microprocessing unit 135 can be programmed to change headings randomly or at predetermined times, without input from the sensor system.

The robotic device 100 is operated in the Room Coverage behavioral mode for a predetermined or random period of time, for a predetermined or random distance (e.g., a maximum or minimum distance) and/or until the occurrence of a specified event, e.g., activation of the obstacle-detection units 120 a predetermined number of times (collectively a transition condition).

A preferred embodiment of the robotic device 100 includes four escape behavioral modes: a Turn behavioral mode, an Edge behavioral mode, a Wheel Drop behavioral mode, and a Slow behavioral mode. One skilled in the art will appreciate that other behavioral modes can be utilized by the robotic device 100. One or more of these behavioral modes may be implemented, for example, in response to a current rise in one of the electric motors 116, 118 of the side brush assembly 140 or dual-stage brush assembly above a low or high stall threshold, forward bumper 106 in compressed position for determined time period, detection of a wheel-drop event.

In the Turn behavioral mode, the robotic device 100 turns in place in a random direction, starting at higher velocity (e.g., twice normal turning velocity) and decreasing to a lower velocity (one-half normal turning velocity), i.e., small panic turns and large panic turns, respectively. Low panic turns are preferably in the range of 45° to 90°, large panic turns are preferably in the range of 90° to 270°. The Turn behavioral mode prevents the robotic device 100 from becoming stuck on room impediments, e.g., high spot in carpet, ramped lamp base, from becoming stuck under room impediments, e.g., under a sofa, or from becoming trapped in a confined area.

In the Edge behavioral mode follows the edge of an obstacle unit it has turned through a predetermined number of degrees, e.g., 60°, without activation of any of the obstacle detection units 120, or until the robotic device has turned through a predetermined number of degrees, e.g., 170°, since initiation of the Edge behavioral mode. The Edge behavioral mode allows the robotic device 100 to move through the smallest possible openings to escape from confined areas.

In the Wheel Drop behavioral mode, the microprocessor 135 reverses the direction of the main wheel drive assemblies 112L, 112R momentarily, then stops them. If the activated wheel drop sensor 124 deactivates within a predetermined time, the microprocessor 135 then reimplements the behavioral mode that was being executed prior to the activation of the wheel drop sensor 124.

In response to certain events, e.g., activation of a wheel drop sensor 124 or a cliff detector 122, the Slow behavioral mode is implemented to slowed down the robotic device 100 for a predetermined distance and then ramped back up to its normal operating speed.

When a safety condition is detected by the sensor subsystem, e.g., a series of brush or wheel stalls that cause the corresponding electric motors to be temporarily cycled off, wheel drop sensor 124 or a cliff detection sensor 122 activated for greater that a predetermined period of time, the robotic device 100 is generally cycled to an off state. In addition, an audible alarm may be generated.

The foregoing description of behavioral modes for the robotic device 100 are intended to be representative of the types of operating modes that can be implemented by the robotic device 100. One skilled in the art will appreciate that the behavioral modes described above can be implemented in other combinations and/or circumstances.

Navigational Control System

Figure 3:
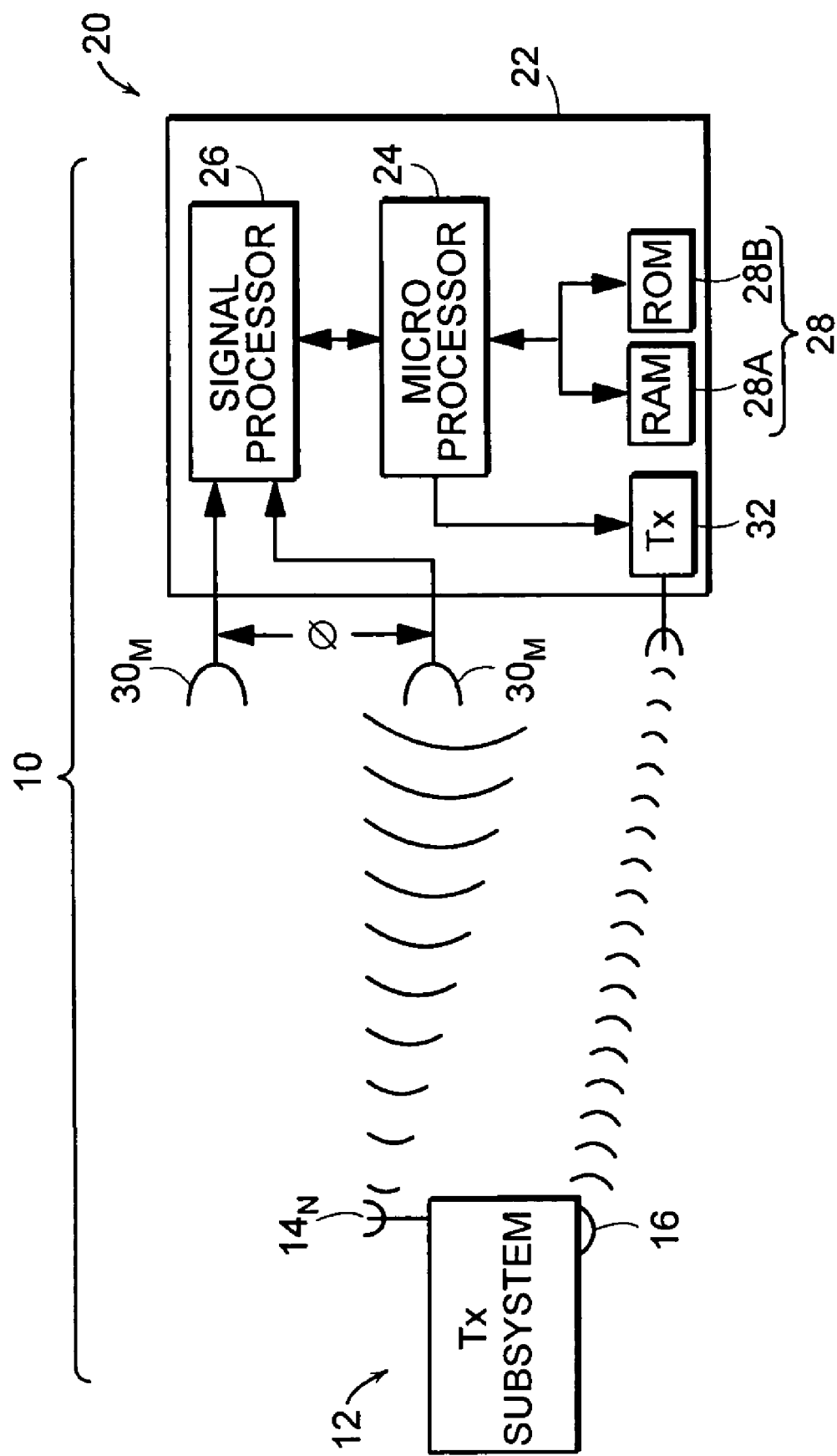
FIG. 3 is a schematic depiction of a navigational control system according to the present invention that comprises a transmitting subsystem and a receiving subsystem.

FIG. 3 is a schematic representation of a navigational control system 10 according to the present invention for use in combination with a robotic device 100 to enhance the cleaning efficiency thereof by adding a deterministic component (in the form of a control signal that remotely controls the movement of the robotic device 100) to the motion algorithms, including random motion, autonomously implemented by the robotic device 100. The navigational control system 10 comprises a transmitting subsystem 12 and a receiving subsystem 20 operating under the direction of a navigation control algorithm. The navigation control algorithm includes a definition of a predetermined triggering event. The specific features and characteristics of the transmitting subsystem 12 and the receiving subsystem 20 depend upon whether the particular subsystem is integrated in combination with the robotic device 100 or functions as a "base station" for the navigational control system 10.

Broadly described, the navigational control system 10 according to the present invention is operative, under the direction of the navigation control algorithm, to monitor the movement activity of the robotic device 100 within the defined working area. In one preferred embodiment, the monitored movement activity is defined in terms of the "position history" of the robotic device 100 as described in further detail below. In another preferred embodiment, the monitored movement activity is defined in terms of the "instantaneous position" of the robotic device 100 as defined in further detail below.

The predetermined triggering event is a specific occurrence or condition in the movement activity of the robotic device 100. Upon the realization of the predetermined triggering event, the navigational control system 10 is operative to generate and communicate a control signal to the robotic device 100. In response to the control signal, the robotic device 100 is operative to implement or execute a conduct prescribed by the control signal, i.e., the prescribed conduct. This prescribed conduct represents a deterministic component of the movement activity of the robotic device 100.

In the preferred embodiment of the navigational control system 10 based upon position history, the system 10 is configured and operative to create a "tessellation" of any defined working area where the robotic device 100 is to be operated, e.g., a room to be cleaned. Tessellate is used herein in the sense that the defined working area is segmented into a set of individual cells, which may or may not be of equal size. For example, FIG. 4 exemplarily illustrates the polar tessellation of a defined working area into a set of individual cells C (reference characters $BS_T$ identify the "base station") of unequal size. The position of each cell C (in terms of its center) is identified in terms of polar coordinates (r, θ) referenced to the base station $BS_T$ as the origin (0, 0). A grid map of the cells C comprising the defined working area is stored in memory of the navigation control system 10. One skilled in the art will appreciate that other coordinate systems, e.g., a planar Cartesian coordinate system, can be used by the navigational control system 10 to define the position of individual cells C within the predetermined working area.

Preferably, the navigational control system 10 is operative to define the size the individual cells C so that the length and width dimensions of an individual cell C are no larger than one-half the width (W) of the cleaning head system 145 of the robotic device 100 (see FIG. 1 and corresponding discussion above).

The navigational control system 10 is operative to generate a position history of the robotic device 100 within the defined working area in terms of such individual cells C (to minimize the memory requirements for storage of position history). The position history comprises a set of discrete, instantaneous positions (in terms of individual cells C) of the robotic device 100 over a time interval where the time interval is a variable that depends upon the "triggering condition" of the navigation control algorithm implemented by the navigational control system 10.

Each discrete instantaneous position of the robotic device 100 is determined by operating the transmitting subsystem 12 to emit a set of directional beams and operating the receiving subsystem 20 to detect one or more of such directional beams and process a signal parameter of the detected beam(s) to determine an absolute bearing parameter and a distance parameter between the transmitting subsystem 12 and the receiving subsystem 20 at a point in time. Each pair of bearing, distance parameters establishes a discrete instantaneous position for the robotic device 100. For the preferred 'position history' embodiment, the navigational control system 10 is operative to correlate each discrete instantaneous position to one individual cell C of the grid map. A set of bearing and position pairs, i.e., a set of instantaneous positions, over a time interval defines a set of cells C, which are identified in the receiving subsystem 20 as the position history of the robotic device 100 for the time interval.

In the preferred embodiment of the navigational control system 10 based upon the instantaneous position, the system 10 processes each discrete instantaneous position as it is established, under the control of the navigation control algorithm, to determine whether such discrete instantaneous position is the predetermined triggering event defined by the navigation control algorithm.

In an advanced embodiment of the navigational control system 10, the system 10 is additionally configured and operative to determine a travel vector (indicating the direction of motion of the robotic device 100 within an individual cell C or at the discrete instantaneous position) at each point in time. These travel vectors may be stored in memory in conjunction with the corresponding cells C as a component of the position history of the robotic device 100.

The navigational control system 10 according to the present invention is further operative, under direction of the navigational control algorithm, to generate and communicate a control signal to the robotic device 100 whenever the navigational control system 100 realizes the predetermined triggering event. In response to any such control signal, the robotic device 100 is configured and operative to initiate a prescribed conduct. The prescribed conduct comprises the deterministic component added to the random motion movement activity of the robotic device 100 by means of the navigational control system 10 according to the present invention.

In one preferred embodiment of the invention, the prescribed conduct of the robotic device 100 comprises one or more basic maneuvers such as CW and CCW turns, forward or aft (straight line) movement, slow down, speed up, and stop. The CW and/or CCW turns can be implemented using the turning techniques of the robotic device 100 described above, and the turn angles can be, for example, over a 360° spectrum at predetermined intervals, e.g., 5° or 10°. Alternatively, or in addition to, the CW and/or CCW turns can be to a specified azimuthal heading (referenced to the base station as the origin) where the navigational control system 10 is configured and operative so that the travel vector is a determinable variable. Of these basic maneuvers, forward (straight line) movement is typically the default maneuver that the robotic device 100 automatically reverts to (implements) once one or more of the other basic maneuvers has been completed.

In another preferred embodiment of the invention, the prescribed conduct of the robotic device 100 comprises one or more of the behavioral modes described herein. In yet a further preferred embodiment of the invention, the prescribed conduct of the robotic device 100 comprises a combination of the basic maneuvers and the behavioral modes described herein.

The transmitting subsystem 12 is operative to transmit a number of directed beams having a predetermined emission pattern along a specific propagation axis. Preferably, the directed beams are planar, i.e., substantially parallel to the surface of the defined working area.

In preferred embodiments of the navigational control system 10 according to the present invention, the transmitting subsystem 12 is integrated in combination with the robotic device 100. The transmitting subsystem 12 is configured and operative to functionally emulate an omnidirectional transmission source with respect to the defined working area, i.e., by emitting a plurality of directed beams that cover the defined working area. For these preferred embodiments, the robotic device 100 further includes a receiver unit 16 (see FIG. 3) configured and operative to receive control signals from the receiving subsystem 20 (see discussion below regarding the transmitting unit 32 of the receiving subsystem 20). While the receiver unit 16 is depicted as a dedicated receiving unit for the control signals, it is prefer-able that the omnidirectional detector 128 (of the virtual wall detection system) described above be adapted to detect and process such control signals.

In one preferred embodiment, the transmitting subsystem 12 comprises a conventional mechanical sweeping transmitter, e.g., a laser, that is integrated in combination with a high point of the housing infrastructure of the robotic device 100 so that none of the structural features of the robotic device 100 interfere with the operation thereof. The mechanical sweeping transmitter is configured and operative to emit the plurality of directed beams while concomitantly redirecting (mechanically sweeping) the transmitting element so that each directed beam has a different propagation axis. Other features and characteristics of the mechanical sweeping transmitter are described below in terms of individual transmitting units $14_N$ for ease of description.

Another preferred embodiment of the transmitting subsystem 12 comprises a set of transmitting units $14_N$, where N is an integer defining the number of individual transmitting units comprising the set for the navigational control system 10, that are integrated in combination with the robotic device 100 about the periphery of its housing infrastructure. Each transmitting unit 14N is configured and operative to emit a directed beam having a predetermined emission pattern along a specific propagation axis. Preferably, the transmitting subsystem 12 is configured and operative so that the emitted directed beams are planar.

In a basic embodiment of the transmitting subsystem 12, the transmitting units $14_N$ are fungible/interchangeable, each operating to emit a directed beam at a common operating frequency. Preferably, the common operating frequency for the transmitting units $14_N$ lies in the infrared range, i.e., about 750 nm to about $1.4 \times 10^4$ nm, preferably about 880 nm to about 980 nm, although one skilled in the art will appreciate that other wavelengths, e.g., in the radio frequency range, microwave frequency range, can be used in the practice of the navigational control system 10 of the present invention.

Preferably, the common operating frequency directed beams emitted by the transmitting units $14_N$ are periodically modulated, e.g., at 10 KHz for 50 msec, off for 300 msec. Modulation of the directed beams facilitates detection thereof by the receiving subsystem 20, i.e., the receiving subsystem 20 is able to readily discriminate between modulated directed beams emitted by the transmitting subsystem 12 and any other electromagnetic radiation sources that may be active in the defined working area, e.g., television remote control units, wireless computer keyboards, microwaves, ambient radiation such as sunlight. For the basic embodiment, it is also preferable that the transmitting units $14_N$ be sequentially operated so that any transmitting unit $14_N$ is cycled on for a predetermined period of time and then cycled off, the next (adjacent) transmitting unit $14_N$ is then cycled on for the predetermined period of time and cycled off, and so forth. Operating the transmitting subsystem 12 in the foregoing manner, i.e., modulation of the directed beam, cycling transmitting units $14_N$ on/off sequentially, minimizes the power requirements of the transmitting subsystem 12 and reduces spurious noise/collateral energy that could adversely impact the functioning of the navigational control system 10.

Ordinarily, a navigational control system 10 employing the basic embodiment of the transmitting subsystem 12, i.e., all transmitting units $14_N$ are interchangeable—emitting directed beams at a common operating frequency, cannot be used to determine travel vectors for the robotic device 100 because the receiving subsystem 20 cannot differentiate between directed beams emitted by the transmitting units $14_N$ and therefore cannot identify any particular transmitting unit $14_N$. However, the inventors have developed two innovative ways of transmitting and processing directed beams emitted by a transmitting subsystem 12 comprised of interchangeable transmitting units 14N so that the receiving subsystem 20 can individually identify a specific interchangeable transmitting unit 14N, and, based upon such identification, establish a travel vector for the robotic device 100.

Accordingly, in one enhanced version of the basic embodiment of the transmitting subsystem 12, interchangeable transmitting units 14N are operated in a predetermined manner that allows the receiving subsystem 20 to process detected directed beams to identify the directed beam having the highest signal strength, which, in turn, allows the receiving subsystem 20 to identify the interchangeable transmitting unit $14_N$ that emitted such directed beam. This, in turn, allows the receiving subsystem 20 to determine the orientation and, hence the travel vector, of the robotic device 100.

Figure 5A:
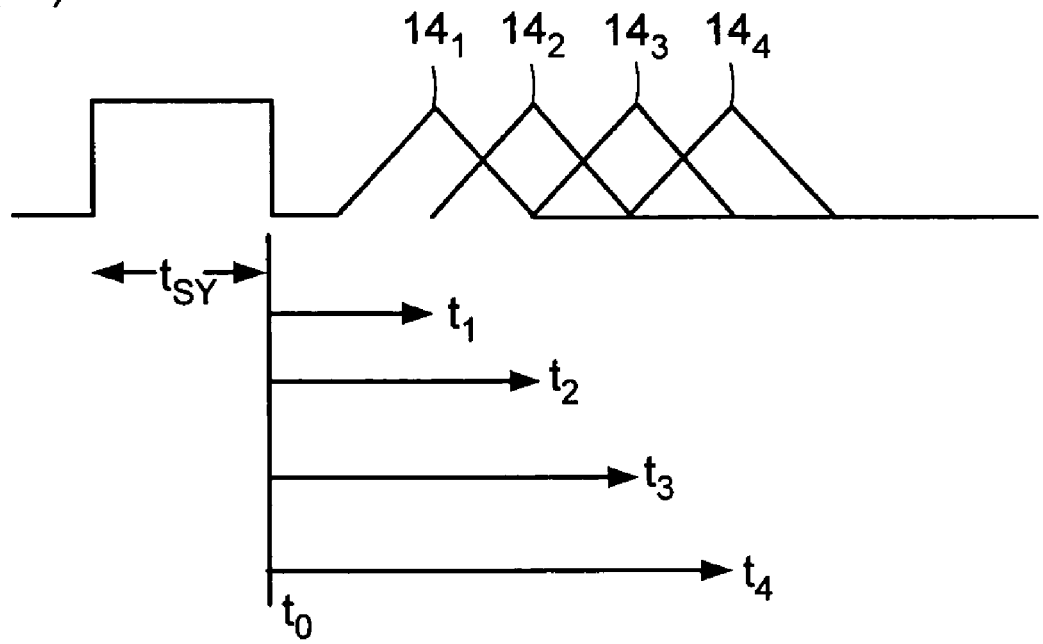
FIG. 5A illustrates the operation of one preferred embodiment of a transmitting subsystem in synchronized operation with the receiving subsystem of a preferred embodiment of the navigational control system according to the present invention.

Referring to FIG. 5A, the transmitting subsystem 12 is first cycled on so that all transmitting units $14_N$ emit directed beams for a predetermined synchronization period, as identified by reference character $t_{SY}$, and then cycled off. The receiver subsystem 20 is operative to detect and process one or more of the directed beams emitted by the transmitting units $14_N$ and identify the predetermined synchronization period $t_{SY}$ of the transmitting subsystem 12. This identification allows the receiving subsystem 20 to synchronize operations between the transmitting subsystem 12 and the receiving subsystem 20 by initializing a timing sequence at the end of the predetermined synchronization period $t_{SY}$ (reference character $t_0$ identifies the initialization of the timing sequence in FIG. 5A).

The transmitting subsystem 12 is further operative so that individual transmitting unit $14_N$ are sequentially cycled on and off at predetermined times with respect to the timing sequence initialization $t_0$ established by the receiving subsystem 20. For example, with respect to FIG. 5A, which illustrates a transmitting subsystem 12 comprising four transmitting units $14_N$ (arbitrarily identified as the first transmitting unit $14_1$, the second transmitting unit $14_2$, the third transmitting unit $14_3$, and the fourth transmitting unit $14_4$), the transmitting subsystem 12 is configured and operative so that each of the transmitting units $14_1$, $14_2$, $14_3$, $14_4$ is sequentially cycled on to emit a directed beam that transitions from a zero (0) signal strength to a peak signal strength to a zero (0) signal strength and then cycled off (a saw-tooth transition pattern is exemplarily illustrated in FIG. 5A—one skilled in the art will appreciate that other types of signal strength transition patterns can be used in the practice of the invention described herein, e.g., a ramped signal strength).

That is, the first transmitting unit $14_1$ is cycled on and transitions to a peak signal strength at time $t_1$. The second transmitting unit $14_2$ is cycled on as the directed beam from the first transmitting unit $14_1$ achieves its peak signal strength at time $t_1$. The second transmitting unit $14_2$ transitions to a peak signal strength at time $t_2$, at which point the first transmitting unit $14_1$ has transitioned to a zero (0) signal strength and is cycled off. The third transmitting unit $14_3$ is cycled on as the directed beam from the second transmitting unit $14_2$ achieves its peak signal strength at time $t_2$. The foregoing operating pattern is repeated for the second, third, and fourth transmitting units $14_2$, $14_3$, $14_4$, as applicable, so that at time $t_3$ the second transmitting unit $14_2$ is cycled off, the directed beam emitted by the third transmitting unit $14_3$ has achieved its peak signal strength, and the fourth transmitting unit $14_4$ is cycled on; and at time $t_4$ the third transmitting unit $14_3$ is cycled off and the directed beam emitted by the fourth transmitting unit $14_4$ has achieved its peak strength. The transmitting subsystem 12 is operative to repeat the above-described synchronization—sequential transmission procedure during operation of the navigational control system 12 according to the present invention.

In another enhanced version of the basic embodiment of the transmitting subsystem 12, interchangeable transmitting units 14N are operated in a different predetermined manner that allows the receiving subsystem 20 to process detected directed beams to identify the directed beam having the highest signal strength, which, in turn, allows the receiving subsystem 20 to identify the interchangeable transmitting unit $14_N$ that emitted such directed beam. This, in turn, allows the receiving subsystem 20 to determine the orientation and, hence the travel vector, of the robotic device 100.

Figure 5B:
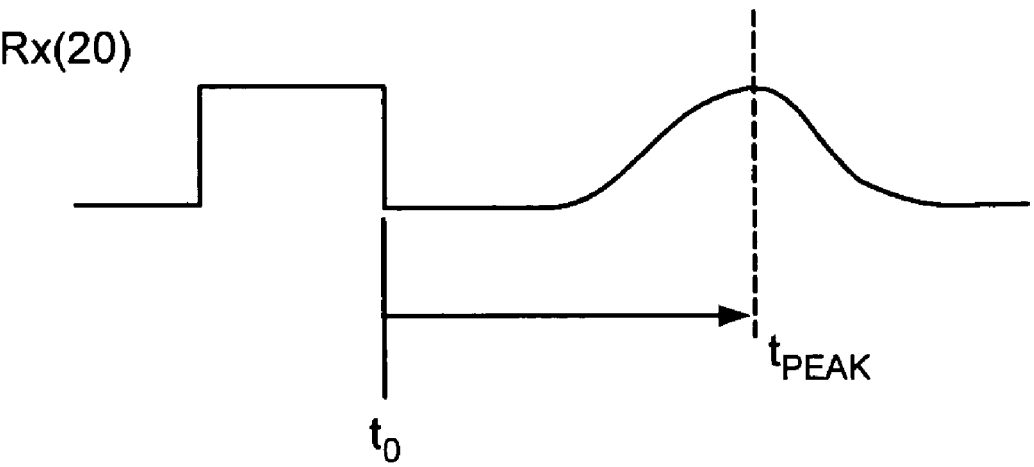
FIG. 5B illustrates the operation of the receiving subsystem in synchronized operation with the transmitting subsystem of FIG. 5A.
Figure 5C:
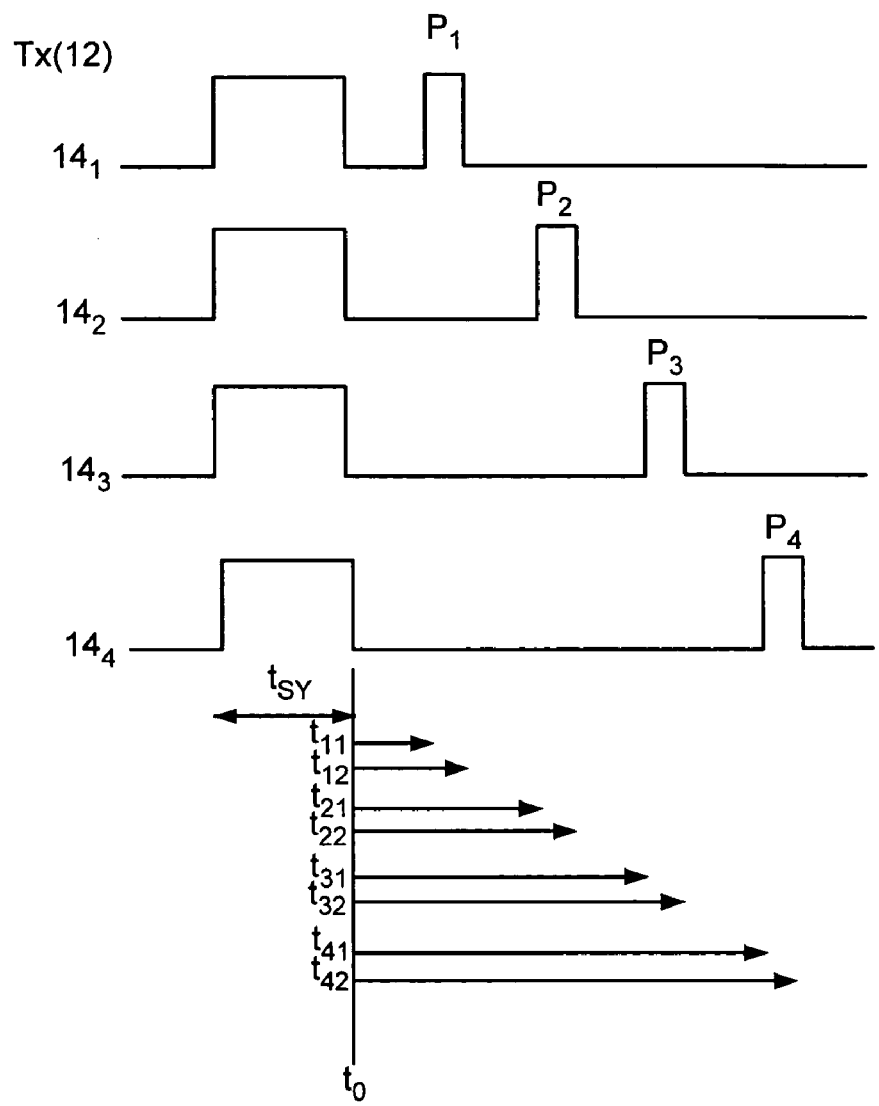
FIG. 5C illustrates the operation of another embodiment of a transmitting subsystem in synchronized operation with the receiving subsystem of a preferred embodiment of the navigational control system according to the present invention.

Referring to FIG. 5C, the transmitting subsystem 12 is first cycled on so that all transmitting units $14_N$ emit directed beams for a predetermined synchronization period, as identified by reference character $t_{12}$, and then cycled off. The receiver subsystem 20 is operative to detect and process one or more of the directed beams emitted by the transmitting units $14_N$ and identify the predetermined synchronization period $t_{12}$ of the transmitting subsystem 12. This identification allows the receiving subsystem 20 to synchronize operations between the transmitting subsystem 12 and the receiving subsystem 20 by initializing a timing sequence at the end of the predetermined synchronization period $t_{SY}$ (reference character $t_0$ identifies the initialization of the timing sequence in FIG. 5A).

The transmitting subsystem 12 is further operative so that individual transmitting unit $14_N$ are sequentially cycled on and off at predetermined times with respect to the timing sequence initialization $t_0$ established by the receiving subsystem 20. For example, with respect to FIG. 5C, which illustrates a transmitting subsystem 12 comprising four transmitting units $14_N$ (arbitrarily identified as the first transmitting unit $14_1$, the second transmitting unit $14_2$, the third transmitting unit $14_3$, and the fourth transmitting unit $14_4$), the transmitting subsystem 12 is configured and operative so that each of the transmitting units $14_1$, $14_2$, $14_3$, $14_4$ is sequentially cycled on to emit a pulsed directed beam have a predetermined pulse width $P_1$, $P_2$, $P_3$, $P_4$, respectively, at a predetermined signal strength, and then cycled off.

That is, the first transmitting unit $14_1$ is cycled on at $t_{11}$ (where the first "1" identifies the transmitting unit number and the second "1" indicates that the transmitting unit is cycled on) and cycled off at $t_{12}$ (where the "2" indicates that the transmitting unit is cycled off). In a similar manner, the second transmitting unit $14_2$ is cycled on at $t_{21}$ and cycled off at $t_{22}$, the third transmitting unit $14_3$ is cycled on at $t_{31}$ and cycled off at $t_{32}$, and fourth transmitting units $14_4$ is cycled on at $t_{41}$ and cycled off at $t_{42}$. The transmitting subsystem 12 is operative to repeat the above-described synchronization—sequential transmission procedure during operation of the navigational control system 12 according to the present invention.

In a more sophisticated embodiment of the transmitting subsystem 12, the transmitting units $14_N$ are discrete and identifiable, each transmitting unit $14_N$ operating at a unique operating frequency to emit a directed beam (which is preferably planar with respect to the surface of the defined working area) having a predetermined emission pattern along a specific propagation axis. These operating frequencies are also preferably modulated to facilitate detection thereof by the receiving subsystem 20 in an environment where other electromagnetic radiation sources are operating. Since each directed beam is readily and uniquely identifiable, the receiving subsystem 20 can process detected directed beams in a conventional manner to derive not only the absolute bearing and to the robotic device 100, but also the travel vector for the robotic device 10 at any particular time.

The receiving subsystem 20 of the navigational control system 10 according to the present invention comprises a processing unit 22 that includes a microprocessor 24, a signal processing unit 26, a memory module 28, and a set of detection units $30_M$. Additionally, the receiving subsystem 20 can also include a transmitting unit 32 for those preferred embodiments of the navigational control system 10 wherein the receiving subsystem 20 is operated or functions as the base station for the navigational control system 10.

The memory module 28 comprises RAM 28A and ROM 28B. Data relating to the current operation of the robotic device 100 within the defined working area is stored in the RAM 28A. Such current operational data can include the grid map of cells C defining the defined working area and the position history of the robotic device 100 within the defined working area for the 'position history' embodiment of the navigational control system 10. Stored in the ROM 28B are one or more navigation control algorithms for the navigational control system 10, a set of one or more control signals associated with each navigation control algorithm, and a signal processing algorithm for converting signals generated by the signal processing unit 26 to one or more sets of instantaneous position parameters, i.e., a bearing, distance pair (and travel vector, if applicable). For the 'position history' embodiment of the system 10, a set of instantaneous position parameters that define the position history of the robotic device 100, which are correlated with the grid map to identify the cells C comprising the position history.

The terminology "navigation control algorithm" as used herein encompasses a set of instructions that: (a) define how the position history or instantaneous position is used by the navigational control system 10 (e.g., counting and comparing cells visited, a true-false determination for cells visited, true-false determination whether the predetermined triggering event has occurred); (b) defines the triggering event or events associated with the use of the position history or the instantaneous position; and (c) identifies the control signal (s) to be implemented when the triggering event is realized. For example, in one representative navigation control algorithm for the 'position history' embodiment of the navigational control system 10 according to the present invention, the microprocessor 24 is operative to count and store the number of visits to each cell and to compute the total number of visits to cells contiguous to (neighboring) each such visited cell (cell counting). The microprocessor 24 is further operative to compare the total number of neighboring-cell visits as each cell is visited to a threshold value (see, e.g., FIG. 4 wherein "$C_V$" identifies a visited cell and "$C_C$" identifies the eight (8) cells contiguous to the visited cell $C_V$). If the total number of neighboring-visits (e.g., fifteen (15) in the example of FIG. 4) for any visited cell is below the threshold number (the triggering event), the microprocessor 24 is operative to cause a control signal to be communicated to the robotic device 100. The control signal causes the robotic device 100 to implement one or more behavioral modes specified by the control signal, e.g., a Spot Coverage pattern as described above.

In another representative navigation control algorithm for the 'position history' embodiment of the navigational control system 10 of the present invention, one or more cells in the stored grid map are pre-identified (i.e., prior to operating the robotic device 100) as "hot spots" in the defined working area. As the robotic device 100 visits any particular cell C, the microprocessor 24 is operative to determine whether the visited cell has been identified as a "hot spot" (true-false determination). If the microprocessor 24 determines that the visited cell C is a "hot spot" (triggering event), the microprocessor 24 is operative to cause a control signal to be communicated to the robotic device 100 via the control signal transmitting unit 32. Reception of the control signal causes the robotic device 100 to implement the prescribed conduct specified by the control signal, e.g., one or more of the basic maneuvers described above and/or a Spot Coverage pattern or Obstacle-Following behavioral mode as described above.

The foregoing representative examples of navigation control algorithms for the 'position history' embodiment of the navigational control system 10 according to the present invention are implemented without knowledge of the travel vector of the robotic device 100, i.e., based solely upon the identification of visited cells by means of the bearing, distance parameters derived by the receiving subsystem 20. Another representative example of a navigation control algorithm for the 'position history' embodiment of the navigation control system 10 of the present invention utilizes the travel vector as an element of the position history in issuing a control signal.

The microprocessor 24 is operative to count and store the number of times a cell has been visited (cell counting) and further operative to compare this number to the number of times each contiguous (or neighboring) cell has been visited. For this navigation control algorithm, the triggering event is a numerical differential between the number of visits to the currently-visited cell number and the number of visits to each of the neighboring-cells that identifies the neighboring cell or cells that have been least-visited as compared to the currently-visited cell. The triggering event would cause the receiving system 20 to issue a control signal to the robotic device 100 that causes the robotic device 100 to move from the currently-visited cell to the neighboring cell that has been visited least, e.g., by implementing one or more basic maneuvers as described herein. If two or more neighboring cells have been visited least, the control signal would cause the robotic device to move from the currently-visited cell to the least visited neighboring cell that is most compatible with the current travel vector of the robotic device 100, e.g., minimum travel distance.

Figure 4:
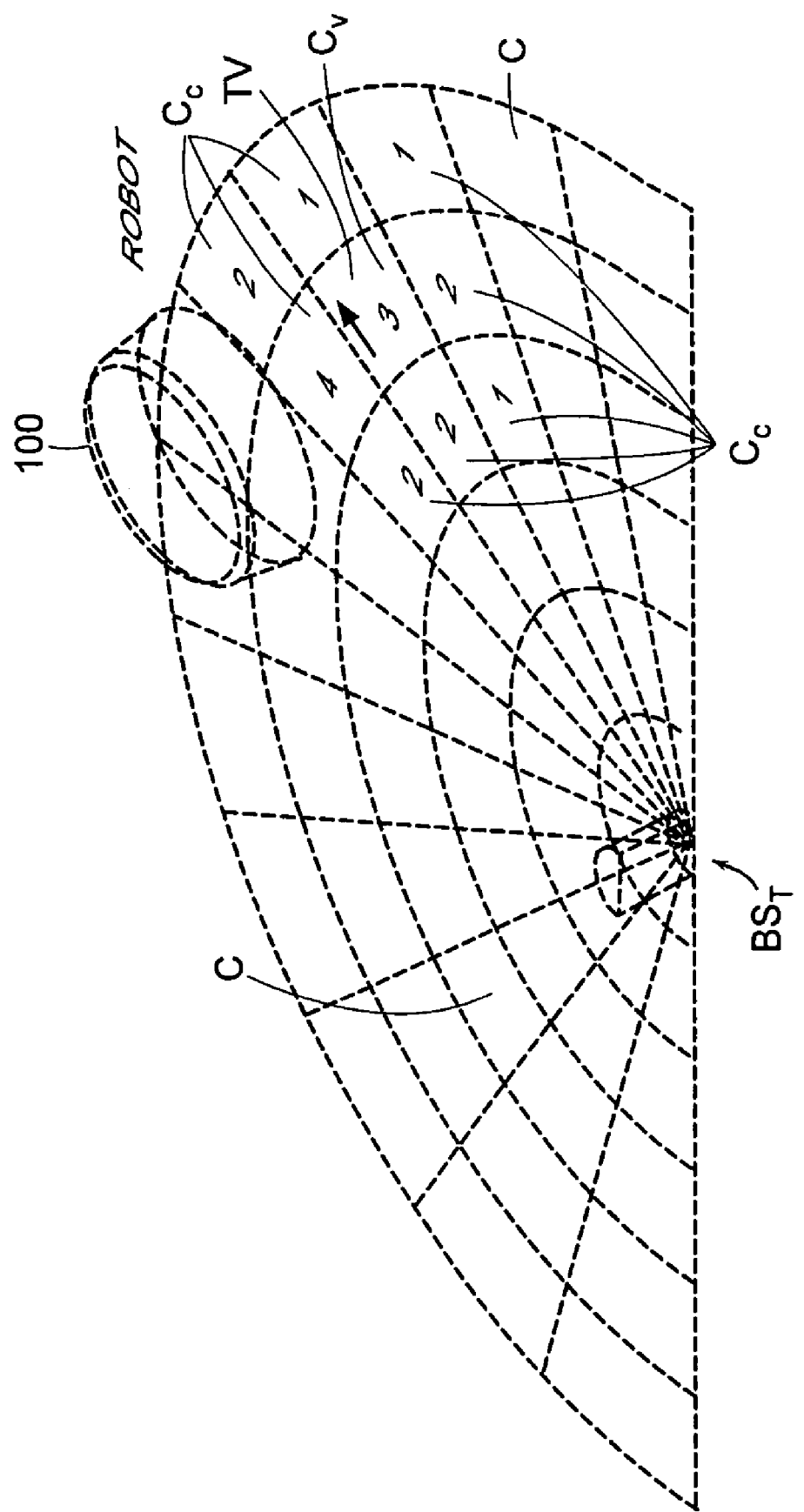
FIG. 4 illustrates a polar tessellation of a defined working area in which a robotic device is operating.

Using FIG. 4 as an example wherein "$C_V$" identifies the currently-visited cell and "$C_C$" identifies the eight (8) cells contiguous to or neighboring the currently-visited cell $C_V$, the neighboring cells $C_C$ that have been visited a single time are the least-visited neighboring cells Cc. If the current travel vector for the robotic device 100 is indicated by the reference characters TV, the control signal would cause the robotic device 100 to continue moving in a straight line, i.e., the move forward basic maneuver (or the Straight-Line behavioral mode) would be executed by the robotic device 100 (if the robotic device 100 was currently operating in some other behavioral mode).

One representative navigation control algorithm for the 'instantaneous position' of the navigational control system 10 uses elapsed time (either random or predetermined) as the predetermined triggering event to cause the robotic device 10 to move to a predetermined position B in the defined working environment. The microprocessor 24 is operative, upon expiration of the elapsed time (the predetermined triggering event), to determine the instantaneous position (hereinafter identified as "position A") of the robotic device 100 as described herein. Since position A is an unknown variable until the predetermined triggering event is realized, the prescribed conduct, i.e., the basic maneuvers, necessary to move the robotic device 100 from position A to position B are also unknown. Once position A has been determined by the navigational control system 10, the basic maneuvers necessary to move the robotic device 100 from position A to position B are determinable since both position A and position B are known variables (in terms of their known bearing, distance parameter pairs with respect to the receiving subsystem 20). A determination of the basic maneuvers that will be implemented by the robotic device 100 can be accomplished by any conventional computational technique.

Another exemplary navigation control algorithm for the 'instantaneous position' embodiment of the navigational control system 10 is a variation of the "hot spot" navigation control algorithm for the 'position history' embodiment of the navigational control system 10. In this illustrative embodiment, both position A and position B are known variables and accordingly, the basic maneuver(s) to move the robotic device 100 from position A to position B are known. In this example, the predetermined triggering event is a TRUE determination that the instantaneous position of the robotic device 100 is equal to position A (position A may be stored in memory 28 as a "zone"—defining some arbitrary area centered about position A—rather than a single point position to increase the probability that the instantaneous position of the robotic device 100 at some time will equal position A).

The receiving subsystem 20 comprises a set of detection units $30_M$ where M is an integer defining the number of individual detection units comprising the set for the navigational control system 10. The number and positioning of the set of detection units $30_M$ should be such that as much of the defined working area as possible is within the field-of-view of the receiving subsystem 20 and that the fields-of-view of at least two (but preferably more) detection units 30M cover the same area within the defined working area.

In preferred embodiments of the navigational control system 10 according to the present invention, the receiving subsystem 20 functions as a "base station" for the system 10. In this functional role, the receiving subsystem 20 is a portable, standalone unit that is stationarily positioned within the defined working area, preferably abutting a wall bounding the defined working area (the 'wall unit' configuration). Alternatively, the receiving subsystem 20 can be positioned within the defined working area distally of the walls bounding the defined working area (the 'free-standing' configuration). The receiving subsystem 20 as the base station establishes and, for the 'position history' embodiment of the navigational control system 10, stores the grid map of cells representing the defined working area and represents the origin (0,0) of the grid map of cells described above.

For those embodiments where the receiving subsystem 20 is operated as a wall unit configuration, the individual detection units $30_M$ have a known spaced-apart relationship and configured and operative to have a 180° field-of-view. For example, FIG. 2 illustrates an embodiment of the receiving subsystem 20 comprising two detection units $30_M$ (M=2) spaced apart by a known angular distance "φ". FIG. 6C illustrates another embodiment of the receiving subsystem 20 comprising three detection units $30_M$ (M=3), i.e., $30_{12}$, $30_{23}$, $30_{13}$, having known angular separations identified by "$\phi_{12}$", "$\phi_{23}$", and "$\phi_{13}$", respectively. Preferred embodiments of the wall unit configuration for the navigational control system 10 include three detection units $30_M$ to provide absolute bearing data to the robotic device 100. A minimum of two detection units 30M are required to provide the necessary signal information for the receiving subsystem 20. More than three detection units $30_M$ can be employed to increase the resolution of the receiving subsystem 20, but at an added cost for each additional detection unit $30_M$ and associated signal processing circuitry (see FIG. 6C which illustrates the representative signal processing circuitry associated with a detection unit $30_M$).

For those embodiments where the receiving subsystem 20 is operated as a free-standing configuration, the individual detection units $30_M$ likewise spaced apart by known angular distances and configured and operative have a field-of-view greater than 180°. A representative embodiment of the receiving subsystem 20 operated as a free-standing base station would comprise four detection units $30_M$.

The detection units $30_M$ are configured and operative to detect a parameter of one or more of the directed beams emitted by the transmitting units $14_N$, e.g., voltages V representing the relative signal strengths of the detected directed beam(s). In a preferred embodiment, each detection unit $30_M$ is configured and operative to average the detected signal strength parameter (e.g., voltage) when the detection unit $30_M$ detects two directed beams simultaneously. The receiving subsystem 20 executes a signal processing algorithm that processes the detected parameters provided by the detection units 30M, i.e., relative signal strengths of the detected beams, utilizing a conventional technique to determine the absolute bearing between the robotic device 100 and the receiving subsystem 20.

To provide the distance determination capability for the receiving subsystem 20, the receiving subsystem 20 is preferably calibrated prior to use. This involves positioning the robotic device 100 at a predetermined distance from the receiving subsystem 20 and operating one (or more) of the transmitting units $14_N$ to emit a directed beam at the receiving subsystem 20. The parameter of the directed beam detected by the detection units $30_M$, e.g., a voltage representing the signal strength of the directed beam as detected, is correlated to the predetermined distance and used to generate a look-up table of signal strength versus distance for the defined working area. This look-up table is stored in the memory module 28 of the receiving subsystem 20. As the signal strengths of directed beams are detected during operation of the navigational control system 10, the receiving subsystem 20 uses the detected signal strengths as pointers to the stored look-up table to determine the corresponding distances (between the receiving subsystem 20 and the robotic device 100).

Alternatively, the receiving subsystem 20 could be configured and operative to implement a signal processing algorithm that utilizes the known attenuation characteristics, i.e., signal strength versus distance, of the operating frequency of the directed beams emitted by the transmitting units $14_N$. This embodiment presupposes that the transmitting units $14_N$ are rated and emitting directed beams of known signal strength.

For the sophisticated embodiment of the navigational control system 10 according to the present invention described above wherein the individual transmitting units $14_N$ of the transmitting subsystem 12 are operated at a unique operating frequency, the detection units $30_M$ of the receiving subsystem 20 are configured to scan the set of unique operating frequencies utilized by the transmitting units $14_N$. The receiving subsystem 20 is configured and operative to cause the detection units $30_M$ to sequentially scan through these frequencies during operation of the navigational control system 10.

For the innovative embodiment of the transmitting subsystem 12 described above in connection with FIG. 5A, FIG. 5B illustrates the operating characteristics of the complementary receiving subsystem 20. The receiving subsystem 20 is configured and operative to detect the directed beams emitted during the predetermined synchronization period $t_{SY}$. At the end of the predetermined synchronization period $t_{SY}$, the receiving subsystem 20 is operative to initiate the timing sequence $t_0$. The receiving subsystem 20 is operative to detect the directed beams as described herein. However, the receiving subsystem 20 is further operative to determine the time at which the peak signal strength is detected, see reference character $t_{peak}$ in FIG. 5B. The receiving subsystem 20 is further operative to correlate the peak signal strength detection time $t_{peak}$ with the known times at which the signal strength of the directed beam emitted by each transmitting unit $14_N$ reached its peak to identify the specific transmitting unit $14_N$ that transmitted the directed beam detected as having the peak signal strength (for the descriptive example presented in FIGS. 5A, 5B, the third transmitting unit $14_3$).

For the innovative embodiment of the transmitting subsystem 12 described above in connection with FIG. 5C, FIG. 5D illustrates the operating characteristics of the complementary receiving subsystem 20. The receiving subsystem 20 is configured and operative to detect the directed beams emitted during the predetermined synchronization period $t_{SY}$. At the end of the predetermined synchronization period $t_{SY}$, the receiving subsystem 20 is operative to initiate the timing sequence $t_0$. The receiving subsystem 20 is operative to detect the directed beams as described herein (as exemplarily illustrated by the detected signal pulses $DP_1$, $DP_2$, $DP_3$, $DP_4$ in FIG. 5D). However, the receiving subsystem 20 is further operative to determine the two highest peak signal strengths of the detected directed beams, see reference characters $DP_3$ and $DP_2$ in FIG. 5D, which depict the highest and next highest detected signal pulses, and the times at which the two highest strength signals were detected ($t_{21}$ and $t_{31}$ in FIG. 5D).

Figure 5D:
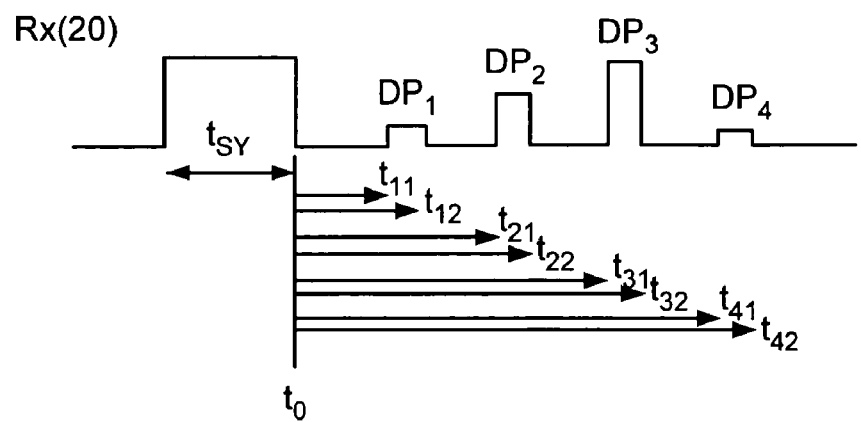
FIG. 5D illustrates the operation of the receiving subsystem in synchronized operation with the transmitting subsystem of FIG. 5C.

The signal strength detection times allows the particular transmitting units $14_N$ on the robotic device 100 to be identified, i.e., transmitting units $14_3$ and $14_2$ in the example of FIG. 5D. The receiving subsystem 20 is then further operative to compute the amplitude ratio of these signal pulses, e.g., $DP_3/DP_2$, and to use such computed amplitude ratio as a pointer to a look-up table that identifies the angular orientation of the identified transmitting units $14_3$, $14_2$, which in turn establishes the travel vector for the robotic device 100.

Even though the transmitting units $14_N$ mounted in combination with the robotic device 100 are interchangeable, the specific location of each individual transmitting unit 14N on the robotic device 100 is a known quantity. Based upon the identification of the transmitting unit 14N that emitted the directed beam detected by the receiving subsystem 20, the receiving subsystem 20 can execute rather straightforward geometric calculations, based upon the location of the identified transmitting unit 14N, to determine the travel vector of the robotic device 100.

When the receiving subsystem 20 functions as the base station, a means is required to communicate the control signal to the robotic device. Accordingly, embodiments of the receiving subsystem 20 that operate as a base station further include a transmitting unit 32 (see FIG. 3). Once the navigation control algorithm implemented by the microprocessor 24 has determined the prescribed conduct to be implemented by the robotic device 10, the microprocessor 24 is operative to select the appropriate control signal to implement such prescribed conduct from the memory module 28. The microprocessor 24 is then operative to activate the transmitting unit 32 to communicate (by transmitting) the control signal to the receiver unit 16 of the robotic device 100 where the prescribed conduct defined by the control signal is implemented by means of the microprocessing unit 135.

While the robotic device 100 is described (and depicted in FIG. 3) as being configured to include a dedicated receiver unit 16 for receiving control signals transmitted by the transmitting unit 32 of the receiving unit 20, it is preferable that the omnidirectional detector 128 (of the virtual wall detection system) be adapted to detect and process such control signals. For those embodiments of the navigational control system 10 according to the present invention wherein the receiving unit 20 is integrated in combination with the robotic device 10, the transmitting unit 32 is not required. Rather, the receiving unit 20 of the navigation control system 100 is electrically coupled to the microprocessing unit 135 (via an I/O port) of the robotic device 100 so that the receiving unit 20 can communicate control signals directly to the microprocessing unit 135.

As disclosed above, in preferred embodiments of the navigational control system 10 according to the present invention, the receiving subsystem 20 functions as the base station, i.e., the wall unit configuration, and the transmitting subsystem 12 is integrated in combination with the robotic device 100. One preferred embodiment that is illustrative of the features and functionality of the navigational control system 10 according to the present invention is exemplarily illustrated in FIGS. 6A–6C.

Figure 6A:
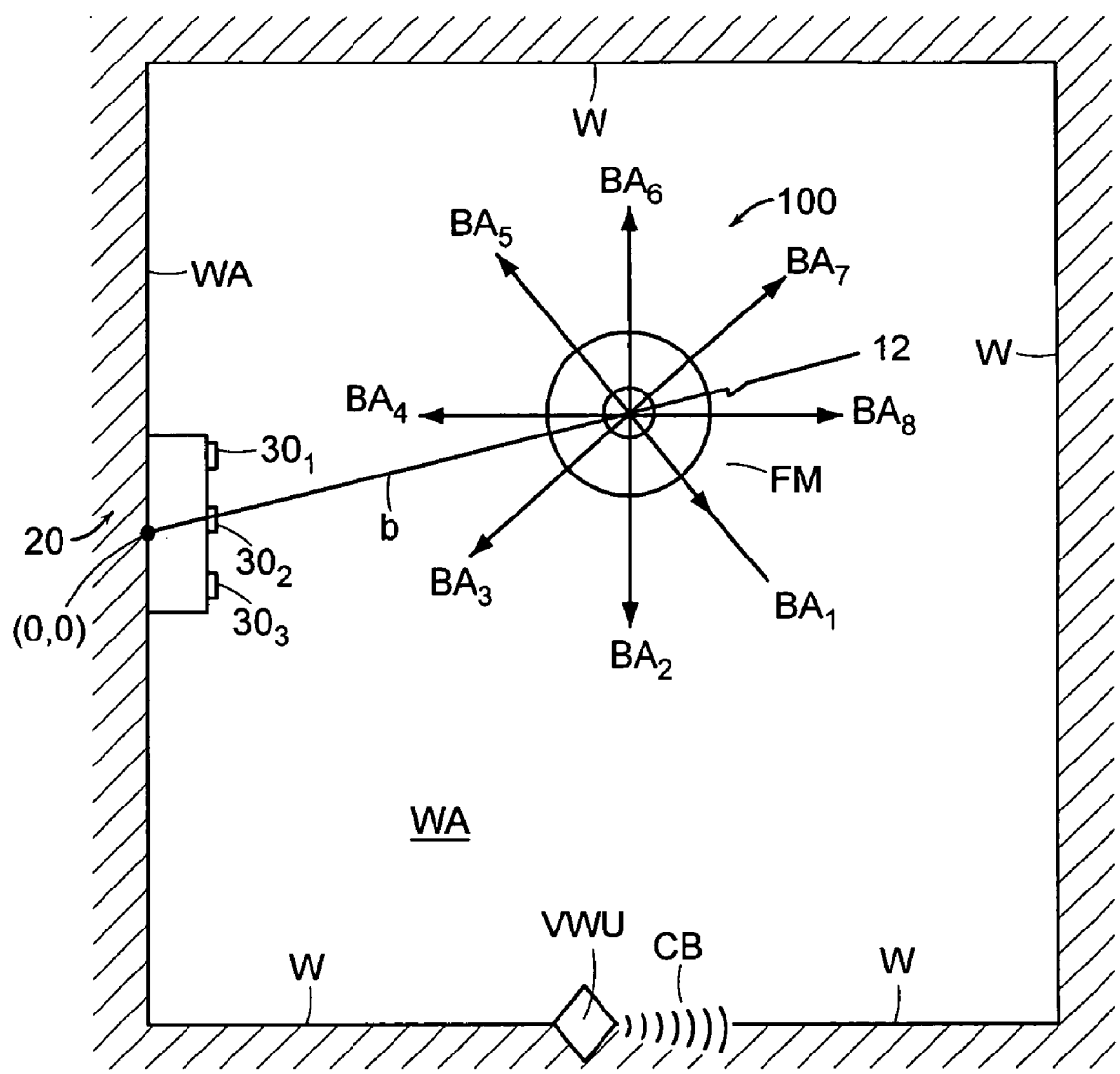
FIG. 6A illustrates one preferred embodiment of a navigational control system according to the present invention wherein the transmitting subsystem in integrated in combination with the robotic device and the receiving system functions as a base station mounted against one wall of a defined working area.

FIG. 6A depicts a robotic device 100 operating in a defined working area WA bounded by walls W. A virtual wall unit VWU is positioned in the only entryway to the working area WA and operative to emit a confinement beam CB that confines the robotic device 100 to operations within the working area WA.

The transmitting subsystem 12 of the illustrated embodiment of the navigational control system 10 is integrated in combination with the robotic device 100 and comprises a set of transmitting units $14_N$ (eight (8) for the described embodiment such that N equals the integers 1–8) that are operative to generate a corresponding set of directed beams $DB_N$ (where N equals the integers 1–8) as illustrated in FIG. 5B (only two directed beams $DB_3$, $DB_4$ are illustrated in FIG. 5B). Reference characters $BA_1$–$BA_8$ identify the propagation axes of the directed beams $DB_N$ emitted by the transmitting units $14_1$–$14_8$, respectively. Each transmitting unit $14_n$ is configured and operative to emit a directed beam $DB_N$ having a predetermined emission pattern $\theta_N$ centered about the corresponding beam axis $BA_N$. For the illustrated embodiment, the emission pattern $\theta_N$ of each directed beam $DB_N$ is approximately 100°.

Preferably, the predetermined emission pattern $\theta_N$ of the directed beams $DB_N$ is correlated with the number of transmitting units $14_N$ so that the transmitting subsystem 12 of the navigational control system 10 emulates an omnidirectional transmitting source. An omnidirectional transmitting source is necessary to ensure that one or more of the directed beams $DB_N$ are detected by the receiving subsystem 20 since the position and orientation of the robotic device 100 in the defined working area (e.g., in terms of its forward motion FM), with respect to the receiving station 20, is an unknown variable at any particular moment in time. Preferably the emission patterns $\theta_N$ of the directed beams $DB_N$ overlap.

Figure 6B:
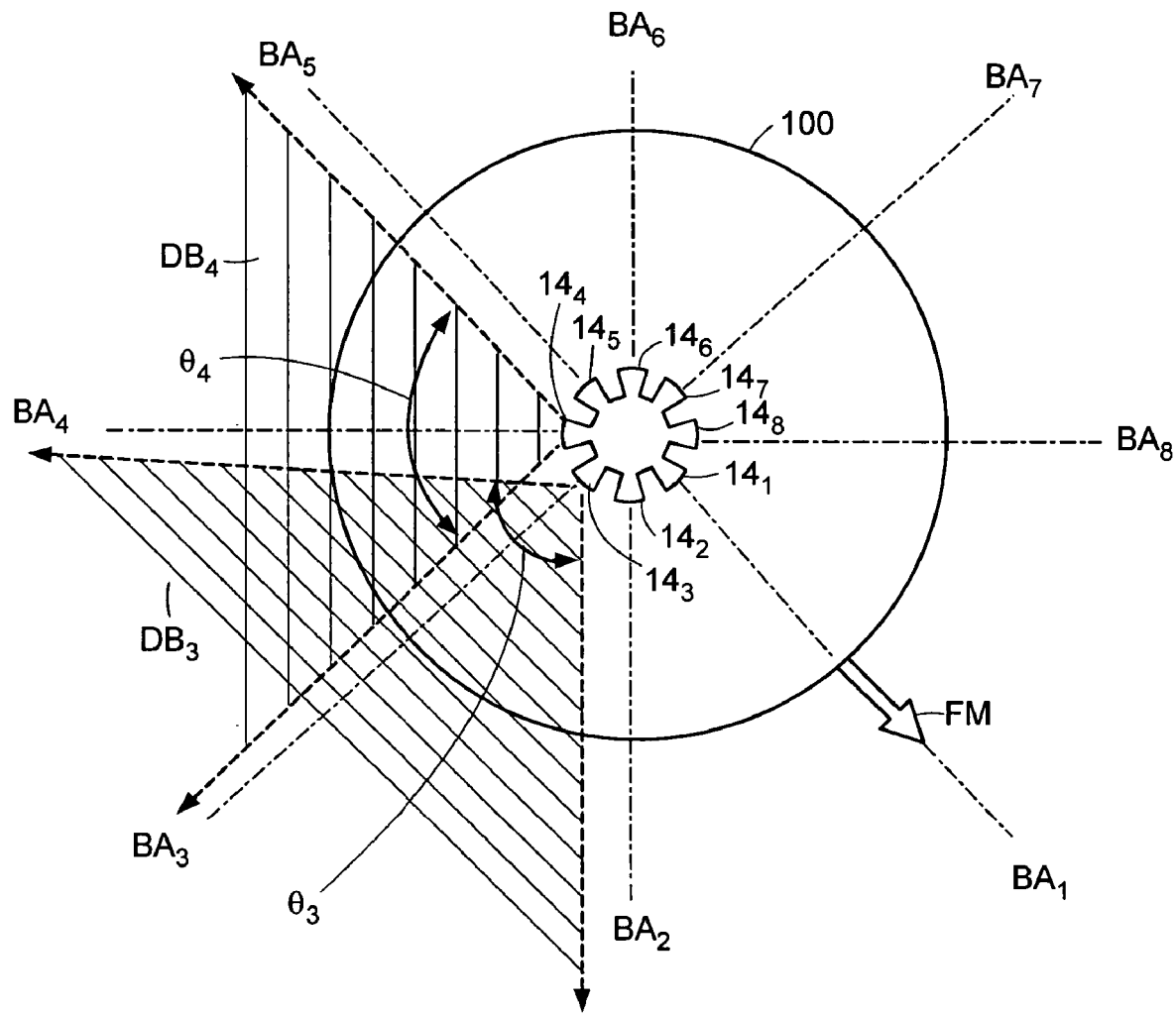
FIG. 6B illustrates the set of transmitting units comprising the transmitting subsystem of the robotic device of FIG. 6A and representative directed beams having a predetermined emission patterns.
Figure 6C:
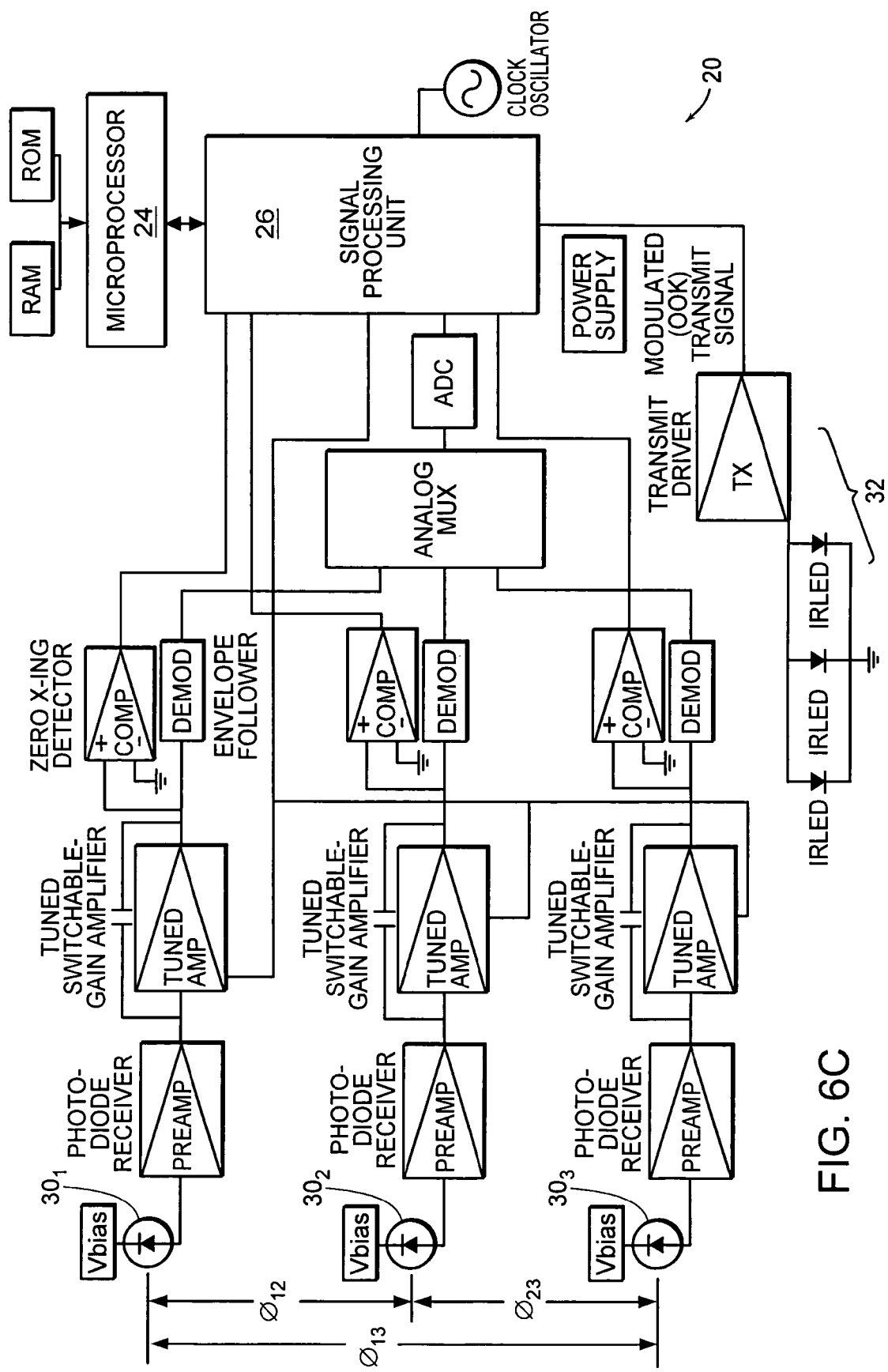
FIG. 6C is a schematic illustration of a preferred embodiment of the receiving subsystem of FIG. 6A.

As an examination of FIGS. 6A, 6B (and in particular FIG. 6B) shows, the directed beams $DB_3$, $DB_4$ emitted by transmitting units $14_3$, $14_4$, respectively, will be detected by the detection units $30_1$, $30_2$, $30_3$ of the receiving subsystem 20. The detection units $30_1$, $30_2$, $30_3$ are operative to detect a parameter representative of the relative signal strengths of the detected beams $DB_3$, $DB_4$, e.g., V1, V2, V3, respectively (as disclosed above each detection unit 30N is operative to average the signal strengths when two directed beams are detected simultaneously).

The receiving subsystem 20 is operative to implement the signal processing algorithm to compute the absolute bearing and distance between the receiving subsystem 20 and the robotic device 100. The receiving subsystem 20 then implements the navigation control algorithm to correlate the computed bearing and distance with one of the cells comprising the grid map of the defined working area WA stored in the memory module 28, and adds such cell to the position history of the robotic device 100 to update the position history. The receiving subsystem 20 is then operative under the navigation control algorithm to determine if there is a predetermined triggering event associated with this updated position history. If so, the receiving subsystem 20 is operative to select the appropriate control signal, as determined by the navigation control algorithm, and transmit such control signal to the receiver unit 16 of the robotic device 100 using the transmitting system 32 (see FIG. 3). The microprocessing unit 135 of the robotic device 100, is operative in response to the reception of the control signal by means of the omnidirectional detector 128, to implement prescribed conduct, e.g., one or more of the basic maneuvers and/or behavioral modes exemplarily described herein, specified by the control signal.

Figure 7:
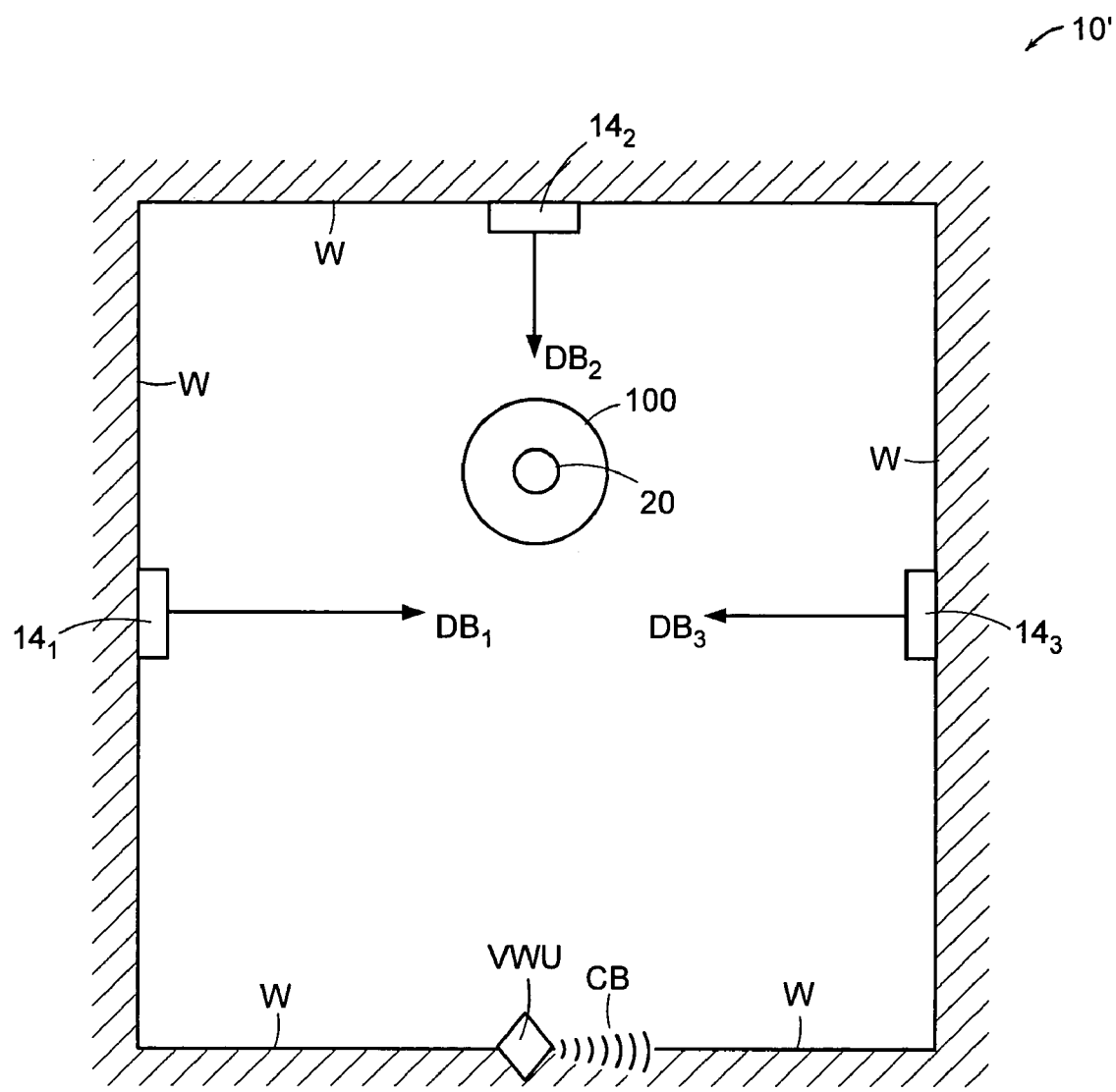
FIG. 7 illustrates an exemplary embodiment of a navigational control system according to the present invention wherein the receiving subsystem is integrated in combination with the robotic device and the transmitting subsystem has a distributed configuration.

An exemplary embodiment of a navigational control system 10' according to the present invention wherein the transmitting subsystem 12 functions as a base station and the receiving subsystem 20 is integrated in combination with the robotic device 100 is illustrated in FIG. 7. The transmitting subsystem 12 comprises a distributed set of transmitting units 14N positioned to abut the walls W of the defined working area. As illustrated in FIG. 7, the transmitting subsystem 12 comprises a first transmitting unit $14_1$, a second transmitting unit $14_2$, and a third transmitting unit $14_3$ positioned in abutting engagement with adjacent walls W, respectively.

Each transmitting unit 14N comprising this distributed set is configured and operative to emit a directed beam having a predetermined emission pattern $\theta_N$ along a predetermined beam axis $DB_N$ ($DB_1$, $DB_2$, and $DB_3$ in FIG. 7 define the predetermined beam axes for the distributed transmitting units $14_1$, $14_2$, $14_3$, respectively) at a unique operating frequency, preferably in the infrared frequency range and preferably modulated as disclosed herein. Preferably, each transmitting unit $14_1$, $14_2$, $14_3$ is configured and operative to generate a predetermined beam emission pattern $\theta_N$ that effectively covers the defined working area WA, i.e., $\theta_N$ is approximately 180° for the distributed transmission subsystem 12 depicted in FIG. 7.

The receiving subsystem 20 for the navigational control system 10' preferably comprises a single omnidirectional detection unit 30 which may be of the type described in commonly-owned, co-pending U.S. patent application Ser. No. 10/056,804, filed 24 Jan. 2002, entitled METHOD AND SYSTEM FOR ROBOT LOCALIZATION AND CONFINEMENT (the virtual wall system summarily described herein). The omnidirectional detection unit 30 is configured and operative to scan through the unique operating frequencies utilized by the distributed transmitting units $14_1$, $14_2$, $14_3$.

The omnidirectional detection unit 30 is operative to detect the directed beams DB1, DB2, DB3 emitted by the distributed transmitting units $14_1$, $14_2$, $14_3$. The receiving subsystem is configured and operative to process the signals of the detected directed beam to determine the absolute position of the robotic device 100 within the defined working area WA. This absolute position is defined in terms of a cell of the grid map of the defined working area WA. A sequence of absolute positions, determined as described above, identifies a sequence of cells that defines the position history of the robotic device 100.

The receiver subsystem 20 is operative as described above to utilize a navigation control algorithm to determine whether a triggering event has occurred in the position history, and if a trigger event has occurred, the receiver subsystem 20 is operative to communicate the control signal associated with the triggering event/navigation control algorithm to the robotic device 100. The robotic device 100 is operative, in response to the communicated control signal, to implement the prescribed conduct specified by the control signal.

A variety of modifications and variations of the present invention are possible in light of the above teachings. The navigational control system 10 according to the present invention has been described above as determining and using the instantaneous position (or a sequence of instantaneous positions) of a robotic device as a control parameter for directly altering the movement activity of the robotic device. One skilled in the art will appreciate that the navigational control system according to the present invention can be used for other purposes. For example, the navigational control system of the present invention can be used for correcting errors in movement activity of robotic devices relying upon dead reckoning. It is therefore to be understood that, within the scope of the appended claims, the present invention may be practiced other than as specifically described herein.

What is claimed is:

1. A navigational control system for directly altering movement activity of a robotic device operating in a defined working area, comprising:

a transmitting subsystem integrated in combination with the robotic device, the transmitting subsystem comprising means for emitting a number of directed beams to cover the defined working area, each directed beam having a predetermined emission pattern; and a receiving subsystem functioning as a base station that includes a navigation control algorithm that defines a predetermined triggering event for the navigational control system and a set of detection units positioned within the defined working area, the detection units being positioned in a known aspectual relationship with respect to one another, the set of detection units being configured and operative to detect one or more of the directed beams emitted by the transmitting subsystem;

wherein the receiving subsystem is configured and operative to process the one or more detected directed beams under the control of the navigational control algorithm to determine whether the predetermined triggering event has occurred, and, if the predetermined triggering event has occurred, to transmit a control signal to the robotic device;

wherein reception of the control signal by the robotic device causes the robotic device to implement a prescribed conduct that alters the movement activity of the robotic device;

wherein the emitting means is configured and operative to emit the directed beams at a common operating frequency;

wherein the transmitting subsystem and the receiving subsystem are synchronized for operation wherein a travel vector for the robotic device is determinable;

wherein the transmitting subsystem is operative to cycle the emitting means on for a predetermined synchronization period and then cycle the emitting means off, initialize a timing sequence when the emitting means is cycled off, and then sequentially cycle the emitting means on and off so that the directed beams achieve peak signal strengths at different times with respect to the initialized timing sequence; and wherein the receiving subsystem is operative to detect one or more of the directed beams emitted by the emitting means during the predetermined synchronization period to identify the predetermined synchronization period; initialize the timing sequence to synchronize operations with the transmitting subsystem; identify a peak signal strength for the detected directed beams and a time of detection of the peak signal strength with respect to the timing sequence initialization; correlate the time of detection of the peak signal strength with the different times at which the directed beams achieve peak signal strength to identify the directed beam having the peak signal strength; and determine the travel vector of the robotic device based upon the known configuration and operation of the emitting means and the identified directed beam.

2. A navigational control system for directly altering movement activity of a robotic device operating in a defined working area, comprising:

a transmitting subsystem integrated in combination with the robotic device, the transmitting subsystem comprising means for emitting a number of directed beams to cover the defined working area, each directed beam having a predetermined emission pattern; and a receiving subsystem functioning as a base station that includes a navigation control algorithm that defines a predetermined triggering event for the navigational control system and a set of detection units positioned within the defined working area, the detection units being positioned in a known aspectual relationship with respect to one another, the set of detection units being configured and operative to detect one or more of the directed beams emitted by the transmitting subsystem;

wherein the receiving subsystem is configured and operative to process the one or more detected directed beams under the control of the navigational control algorithm to determine whether the predetermined triggering event has occurred, and, if the predetermined triggering event has occurred, to transmit a control signal to the robotic device;

wherein reception of the control signal by the robotic device causes the robotic device to implement a prescribed conduct that alters the movement activity of the robotic wherein the emitting means is configured and operative to emit the directed beams at a common operating frequency;

wherein the transmitting subsystem and the receiving subsystem are synchronized for operation wherein a travel vector for the robotic device is determinable; and wherein the transmitting subsystem is operative to cycle the emitting means on for a predetermined synchronization period and then cycle the emitting means off, initialize a timing sequence when the emitting means is cycled off, and then sequentially cycle the emitting means on and off so that the directed beams have a pulsed waveform at different times with respect to the initialized timing sequence; and wherein the receiving subsystem is operative to detect one or more of the directed beams emitted by the emitting means during the predetermined synchronization period to identify the predetermined synchronization period; initialize the timing sequence to synchronize operations with the transmitting subsystem; identify detected pulsed waveforms having a highest and next highest signal strength and times of detection of the highest and next highest signal strengths in terms of the timing sequence initialization; correlate the times of detection of the highest and next highest signal strengths with the different times of emission of the directed beams to identify the directed beams having the highest and next highest signal strengths; compute an amplitude ratio for the identified directed beams using the highest and next highest signal strengths; and use the computed amplitude ratio as a pointer to a look-up table to determine the travel vector of the robotic device based upon the known configuration and operation of the emitting means and the identified directed beams.

3. A navigational control system for directly altering movement activity of a robotic device operating in a defined working area, comprising:

a transmitting subsystem integrated in combination with the robotic device, the transmitting subsystem comprising means for emitting a number of directed beams to cover the defined working area, each directed beam having a predetermined emission pattern; and a receiving subsystem functioning as a base station that includes a navigation control algorithm that defines a predetermined triggering event for the navigational control system and a set of detection units positioned within the defined working area, the detection units being positioned in a known aspectual relationship with respect to one another, the set of detection units being configured and operative to detect one or more of the directed beams emitted by the transmitting subsystem;

wherein the receiving subsystem is configured and operative to process the one or more detected directed beams under the control of the navigational control algorithm to determine whether the predetermined triggering event has occurred, and, if the predetermined triggering event has occurred, to transmit a control signal to the robotic device;

wherein reception of the control signal by the robotic device causes the robotic device to implement a prescribed conduct that alters the movement activity of the robotic device;

and wherein the set of detection units comprises a first detection unit, a second detection unit, and a third detection unit, and wherein the first and second detection units are spaced-apart by a known angular distance, the second and third detection units are spaced-apart by a known angular distance, and the first and third detection units are spaced apart by a known angular distance.

4. The navigational control system of claim 3 wherein the receiving subsystem is configured and operative to segment the defined working area into a plurality of cells that define a grid map of the defined working area referenced to the receiving subsystem;

process signals representative of detection of the one or more directed beams over a time interval to determine a set of instantaneous positions representing the movement activity of the robotic device;

correlate the set of instantaneous positions with the grid map identify a set of cells from the grid map corresponding to the set of instantaneous positions wherein the set of cells is the position history; and implement the navigation control algorithm to evaluate the position history to determine whether the predetermined triggering event has occurred.

5. The navigational control system of claim 4 wherein each of the instantaneous positions comprises a bearing parameter and a distance parameter of the robotic device with respect to the receiving subsystem.

* * * * *

UNITED STATES PATENT AND TRADEMARK OFFICE
CERTIFICATE OF CORRECTION

PATENT NO. : 7,024,278 B2
APPLICATION NO. : 10/661835
DATED : April 4, 2006
INVENTOR(S) : Mark Chiappetta and Joseph L. Jones It is certified that error appears in the above-identified patent and that said Letters Patent is hereby corrected as shown below:

Col. 25, claim 2, line 64, after "robotic" insert --device;--

Col. 25, claim 2, line 67, replace ":" with --;--

Signed and Sealed this

Twenty-seventh Day of February, 2007

JON W. DUDAS
*Director of the United States Patent and Trademark Office*